United States Patent
Tomiyori et al.

(10) Patent No.: US 12,410,339 B2
(45) Date of Patent: Sep. 9, 2025

(54) ARTICLE WITH SURFACE LAYER

(71) Applicant: AGC Inc., Tokyo (JP)

(72) Inventors: Yusuke Tomiyori, Tokyo (JP); Taiki Hoshino, Tokyo (JP); Eiichiro Anraku, Tokyo (JP); Kenji Ishizeki, Tokyo (JP); Ryoji Akiyama, Tokyo (JP)

(73) Assignee: AGC Inc., Tokyo (JP)

( * ) Notice: Subject to any disclaimer, the term of this patent is extended or adjusted under 35 U.S.C. 154(b) by 871 days.

(21) Appl. No.: 17/644,386

(22) Filed: Dec. 15, 2021

(65) Prior Publication Data

US 2022/0106495 A1 Apr. 7, 2022

Related U.S. Application Data

(63) Continuation of application No. PCT/JP2020/027727, filed on Jul. 16, 2020.

(30) Foreign Application Priority Data

Jul. 18, 2019 (JP) ................... 2019-133052

(51) Int. Cl.
*C09D 171/02* (2006.01)
*C07F 7/18* (2006.01)
*C08G 65/336* (2006.01)

(52) U.S. Cl.
CPC .......... *C09D 171/02* (2013.01); *C07F 7/1804* (2013.01); *C08G 65/336* (2013.01)

(58) Field of Classification Search
CPC ... C09D 175/16; C09D 171/02; C08G 65/336
See application file for complete search history.

(56) References Cited

U.S. PATENT DOCUMENTS

| 6,906,115 | B2 * | 6/2005 | Hanazawa | C09D 175/16 528/70 |
| 2010/0129672 | A1 * | 5/2010 | Hao | C08G 65/336 428/447 |
| 2014/0302332 | A1 * | 10/2014 | Murotani | B05D 1/005 556/419 |
| 2018/0142062 | A1 * | 5/2018 | Hoshino | C08G 65/226 |

FOREIGN PATENT DOCUMENTS

| KR | 10-2015-0083024 | | 7/2015 |
| WO | WO 2017/038832 A1 | | 3/2017 |
| WO | WO 2017/187775 A1 | | 11/2017 |

OTHER PUBLICATIONS

International Search Report issued Sep. 29, 2020 in PCT/JP2020/027727 filed on Jul. 16, 2020, 3 pages.

\* cited by examiner

*Primary Examiner* — Khanh T Nguyen

(74) *Attorney, Agent, or Firm* — Oblon, McClelland, Maier &Neustadt, L.L.P.

(57) ABSTRACT

An article with a surface layer, that is excellent in fingerprint stain removability, friction resistance, and adhesion to a protective film of the surface layer. The article includes a base material and a surface layer provided on the surface of the base material. The surface layer contains groups having —O— between carbon-carbon atoms of a fluoroalkyl group with two or more carbon atoms and has a normalized F intensity in a range of 0.38 to 0.53, where the normalized F intensity is obtained by preparing a glass containing 4.96 mass % of fluorine atoms as a standard sample, measuring, by an X-ray fluorescence spectrometer, the fluorine atom intensity in the surface layer and the fluorine atom intensity in the standard sample, respectively, and dividing the fluorine atom intensity in the surface layer by the fluorine atom intensity in the standard sample.

20 Claims, No Drawings

ARTICLE WITH SURFACE LAYER

TECHNICAL FIELD

The present invention relates to an article with a surface layer, in which a surface layer containing fluorine atoms is provided on the surface of a base material.

BACKGROUND ART

A fluorinated ether compound containing perfluoropolyether chains and hydrolyzable silyl groups is suitable for use in a surface treating agent because it can form a surface layer on the surface of a base material, that exhibits high lubricity, water and oil repellency, etc. A surface treating agent containing a fluorinated ether compound is used in an application where the performance that the water and oil repellency of the surface layer is hardly degraded even when the surface layer is repeatedly rubbed by fingers (friction resistance) and the performance that the fingerprints on the surface layer can be easily removed by wiping (fingerprint stain removability), are maintained over a long period of time. For example, it is used as a surface treating agent for a component constituting a finger-touch surface of a touch panel, or for an eyeglass lens, or a display of a wearable terminal.

As a fluorinated ether compound capable of forming a surface layer excellent in friction resistance and fingerprint stain removability on the surface of a base material, a fluorinated ether compound having perfluoropolyether chains and multiple hydrolyzable silyl groups has been proposed (Patent Documents 1 and 2).

PRIOR ART DOCUMENTS

Patent Documents

Patent Document 1: WO2017/038832
Patent Document 2: WO2017/187775

DISCLOSURE OF INVENTION

Technical Problem

After a surface layer is formed on the surface of a base material by using a surface treating agent, a peelable protective film may be attached to the surface of the surface layer to protect the surface layer until the article with the surface layer is used in the next process.

When the present inventors evaluated an article with a surface layer, obtained by surface-treating the entire main surface of a base material with a surface treating agent containing a fluorinated ether compound, they found that the adhesion between the surface layer and the protective film was insufficient. For example, during storage or transportation of the article with the surface layer, the protective film may peel off from the surface layer, or dust may enter a gap formed between the protective film and the surface layer.

The purpose of the present invention is to provide an article with a surface layer, that is excellent in fingerprint stain removability, friction resistance, and adhesion to a protective film.

Solution to Problem

The present invention provides an article with a surface layer having the following constructions [1] to [12].
[1] An article with a surface layer, comprising a base material and a surface layer provided on the surface of the base material and characterized in that
the surface layer contains groups having —O— between carbon-carbon atoms of a fluoroalkyl group with two or more carbon atoms, and
the normalized F intensity in the surface layer obtained by the following method is from 0.38 to 0.53:
(Method for Obtaining the Normalized F Intensity)
A glass containing 4.96 mass % of fluorine atoms (IGS G4 Fluoride Opal Glass manufactured by Bureau of Analysed Samples Ltd.) is prepared as a standard sample, by an X-ray fluorescence spectrometer, the fluorine atom intensity in the surface layer and the fluorine atom intensity in the standard sample, are measured, respectively, and the fluorine atom intensity in the surface layer is divided by the fluorine atom intensity in the standard sample, whereby the obtained value is adopted as the normalized F intensity.
[2] The article with a surface layer according to [1], wherein the molecular weight of the groups having —O— between carbon-carbon atoms of the fluoroalkyl group with two or more carbon atoms is from 1,500 to 4,000.
[3] The article with a surface layer according to [1] or [2], wherein the surface layer is a surface layer formed from a fluorinated ether compound having a group having —O— between carbon-carbon atoms of a fluoroalkyl group with two or more carbon atoms, and having a reactive silyl group, or from a fluorinated ether composition containing said fluorinated ether compound.
[4] The article with a surface layer according to [3], wherein the fluorinated ether compound is a compound represented by the following formula (1):

where $R^f$ is a group having —O— between carbon-carbon atoms of a fluoroalkyl group having two or more carbon atoms (where at least one fluorine atom is bonded to the terminal carbon atom on the Q side), and when there are two or more $R^f$, the two or more $R^f$ may be the same or different, and Q is an a+b valent linking group,
T is —Si(R)$_{3-c}$(L)$_c$, and when there are two or more T, the two or more T may be the same or different,
R is an alkyl group,
L is a hydrolyzable group or a hydroxy group, and two or more L in T may be the same or different.
a is an integer of at least 1,
b is an integer of at least 1, and
c is 2 or 3.
[5] The article with a surface layer according to [4], wherein b is an integer of from 2 to 20.
[6] The article with a surface layer according to [4] or [5], wherein a is an integer from 1 to 6.
[7] The article with a surface layer according to any one of [4] to [6], wherein $R^f$ is a group represented by the following formula (g1):

where $R^{f1}$ is a C$_{1-6}$ fluoroalkyl group,
$R^{f2}$ is a C$_{1-6}$ fluoroalkylene group (where at least one fluorine atom is bonded to the terminal carbon atom on the Q side of $R^{f2}$ bonded to Q), and m is an integer of at least 1, and when m is 2 or more, $(OR^{f2})_m$ may consist of two or more types of $OR^{f2}$.

[8] The article with a surface layer according to [7], wherein $R^{f1}$ is a perfluoroalkyl group.

[9] The article with a surface layer according to [7] or [8], wherein m is an integer of from 4 to 40, and the proportion of perfluoroalkylene groups among all $R^{f2}$ is from 60 to 100 mol %.

[10] The article with a surface layer according to any one of [4] to [9], wherein Q is a group represented by the formula (g2-1) (where a=d1+d3, and b=d2+d4), a group represented by the formula (g2-2) (where a=e1, and b=e2), a group represented by the formula (g2-3) (where a=1, and b=2), a group represented by the formula (g2-4) (where a=h1, and b=h2), the group represented by the formula (g2-5) (where a=i1, and b=i2), or a group represented by the formula (g2-6) (where a=1 and b=1):

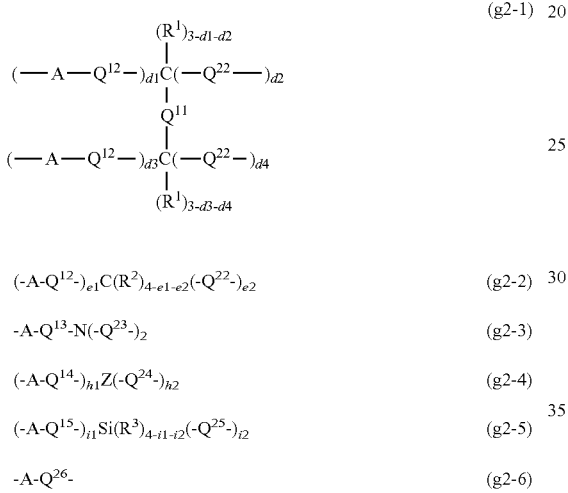

$(-A-Q^{12}-)_{e1}C(R^2)_{4-e1-e2}(-Q^{22}-)_{e2}$ (g2-2)

$-A-Q^{13}-N(-Q^{23}-)_2$ (g2-3)

$(-A-Q^{14}-)_{h1}Z(-Q^{24}-)_{h2}$ (g2-4)

$(-A-Q^{15}-)_{i1}Si(R^3)_{4-i1-i2}(-Q^{25}-)_{i2}$ (g2-5)

$-A-Q^{26}-$ (g2-6)

provided that in the formula (g2-1) to formula (g2-6), the A side is bonded to $R^f$, and the $Q^{22}$, $Q^{23}$, $Q^{24}$, $Q^{25}$ or $Q^{26}$ side is bonded to T, A is a single bond, $-C(O)NR^6-$, $-C(O)-$, $-O-$, or $-SO_2NR^6-$, $Q^{11}$ is a single bond, $-O-$, an alkylene group, or a group having $-C(O)NR^6-$, $-C(O)-$, $-NR^6-$, or $-O-$ between carbon-carbon atoms of an alkylene group with two or more carbon atoms, $Q^{12}$ is a single bond, an alkylene group, or a group having $-C(O)NR^6-$, $-C(O)-$, $-NR^6-$, or $-O-$ between carbon-carbon atoms of an alkylene group with two or more carbon atoms, and when Q has two or more $Q^{12}$, the two or more $Q^{12}$ may be the same or different, $Q^{13}$ is a single bond (provided that A is limited to $-C(O)-$), an alkylene group, a group having $-C(O)NR^6-$, $-C(O)-$, $-NR^6-$, or $-O-$ between carbon-carbon atoms of an alkylene group with two or more carbon atoms, or a group having $-C(O)-$ at the terminal of the N-side of an alkylene group, $Q^{14}$ is $Q^{12}$ when the atom in Z to which $Q^{14}$ is bonded is a carbon atom, or $Q^{13}$ when the atom in Z to which $Q^{14}$ is bonded is a nitrogen atom, and when Q has two or more $Q^{14}$, the two or more $Q^{14}$ may be the same or different, $Q^{15}$ is an alkylene group, or a group having $-C(O)NR^6-$, $-C(O)-$, $-NR^6-$, or $-O-$ between carbon-carbon atoms of an alkylene group with two or more carbon atoms, and when Q has two or more $Q^{15}$, the two or more $Q^{15}$ may be the same or different, $Q^{22}$ is an alkylene group, a group having $-C(O)NR^6-$, $-C(O)-$, $-NR^6-$, or $-O-$ between carbon-carbon atoms of an alkylene group with two or more carbon atoms, a group having $-C(O)NR^6-$, $-C(O)-$, $-NR^6-$, or $-O-$ at the terminal on the side not connected to Si of an alkylene group, or a group having $-C(O)NR^6-$, $-C(O)-$, $-NR^6-$, or $-O-$ between carbon-carbon atoms of an alkylene group with two or more carbon atoms and having $-C(O)NR^6-$, $-C(O)-$, $-NR^6-$, or $-O-$ at the terminal on the side not bonded to Si, and when Q has two or more $Q^{22}$, the two or more $Q^{22}$ may be the same or different, $Q^{23}$ is an alkylene group, or a group having $-C(O)NR^6-$, $-C(O)-$, $-NR^6-$, or $-O-$ between carbon-carbon atoms of an alkylene group with two or more carbon atoms, and the two $Q^{23}$ may be the same or different, $Q^{24}$ is $Q^{22}$ when the atom in Z to which $Q^{24}$ is bonded is a carbon atom, $Q^{23}$ when the atom in Z to which $Q^{24}$ is bonded is a nitrogen atom, and when Q has two or more $Q^{24}$, the two or more $Q^{24}$ may be the same or different, $Q^{25}$ is an alkylene group, or a group having $-C(O)NR^6-$, $-C(O)-$, $-NR^6-$, or $-O-$ between carbon-carbon atoms of an alkylene group with two or more carbon atoms, and when Q has two or more $Q^{25}$, the two or more $Q^{25}$ may be the same or different, $Q^{26}$ is an alkylene group, or a group having $-C(O)NR^6-$, $-C(O)-$, $-NR^6-$ or $-O-$ between carbon-carbon atoms of an alkylene group with two or more carbon atoms, Z is a group having an a+b valent ring structure having a carbon or nitrogen atom to which $Q^{14}$ is directly bonded and a carbon or nitrogen atom to which $Q^{24}$ is directly bonded, $R^1$ is a hydrogen atom or an alkyl group, and when Q has two or more $R^1$, the two or more $R^1$ may be the same or different, $R^2$ is a hydrogen atom, a hydroxy group, an alkyl group, or an acyloxy group, $R^3$ is an alkyl group, $R^6$ is a hydrogen atom, a $C_{1-6}$ alkyl group, or a phenyl group, d1 is an integer of from 0 to 3, d2 is an integer of from 0 to 3, and d1+d2 is an integer of from 1 to 3, d3 is an integer of from 0 to 3, d4 is an integer of from 0 to 3, and d3+d4 is an integer of from 1 to 3, d1+d3 is an integer of from 1 to 5, and d2+d4 is an integer of from 1 to 5, e1 is an integer of from 1 to 3, e2 is an integer of from 1 to 3, and e1+e2 is 3 or 4, h1 is an integer of at least 1, and h2 is an integer of at least 1, and i1 is an integer of from 1 to 3, i2 is an integer from 1 to 3, and i1+i2 is 3 or 4.

[11] The article with a surface layer according to any one of [4] to [10], wherein L is a $C_{1-4}$ alkoxy group.

[12] The article with a surface layer according to any one of [1] to [11], which is a member that constitutes the finger-touching surface of a touch panel.

Advantageous Effects of Invention

The article with a surface layer of the present invention is excellent in fingerprint stain removability, friction resistance, and adhesion to a protective film, of the surface layer.

DESCRIPTION OF EMBODIMENTS

In this specification, a compound represented by the formula (1) is referred to as compound (1). Compounds represented by other formulas are also referred to in the same way.

A group represented by the formula (g1) is referred to as group (g1). Groups represented by other formulas are also referred to in the same way.

The chemical formula of an oxyfluoroalkylene unit shall be expressed with its oxygen atom listed to the left of the fluoroalkylene group.

The meanings of the following terms in this specification are as follows.

A "surface layer" means a layer to be formed on the surface of a base material.

A "reactive silyl group" is a general term for a hydrolyzable silyl group and a silanol group (Si—OH). The reactive silyl group is, for example, T in the formula (1), i.e. —Si(R)$_{3-c}$(L)$_c$.

A "hydrolyzable silyl group" means a group that can form a silanol group by a hydrolytic reaction.

In a case where a fluorinated ether compound is a mixture of a plurality of fluorinated ether compounds different in the chain length of the group (R$^f$) having —O— between carbon-carbon atoms of a fluoroalkyl group with two or more carbon atoms, the "molecular weight" of R$^f$ is a number-average molecular weight calculated by obtaining the number (average value) of oxyfluoroalkylene units based on the terminal group, by $^1$H-NMR and $^{19}$F-NMR. The terminal group is, for example, R$^{f1}$ in the formula (g1a), or T in the formula (1).

In a case where a fluorinated ether compound is a fluorinated ether compound with a single chain length of R$^f$, the "molecular weight" of R$^f$ is a molecular weight calculated by determining the structure of R$^f$ by $^1$H-NMR and $^{19}$F-NMR.

[Article with Surface Layer]

The article with a surface layer of the present invention comprises a base material and a surface layer provided on the surface of the base material.

The surface layer may be formed on a portion of the surface of the base material, or on all surfaces of the base material. The surface layer may be spread in the form of a film over the surface of the base material, or may be scattered in the form of dots.

As the base material, a base material that is required to have water and oil repellency may be mentioned. For example, a base material that may be used in contact with another item (e.g. a stylus) or a human finger, a base material that may be held by human fingers during operation, or a base material that may be placed on top of another item (e.g. a table), may be mentioned.

As the material for the base material, for example, a metal, a resin, glass, sapphire, ceramic, a stone, or a composite of these materials, may be mentioned. Glass may be chemically strengthened. On the surface of the base material, a primer film such as a SiO$_2$ film, may be formed.

The primer film is preferably a layer containing an oxide which contains at least silicon, and may also have other elements. When the primer film contains silicon oxide, a reactive silyl group of a fluorinated ether compound A as described below will be dehydrated and condensed, and a Si—O—Si bond will be formed between it and the primer film, whereby a surface layer excellent in wear durability will be formed.

The content of silicon oxide in the primer film may be at least 65 mass %, and is preferably at least 80 mass %, more preferably at least 85 mass %, further preferably at least 90 mass %. When the silicon oxide content is at least the lower limit value in the above range, Si—O—Si bonds are sufficiently formed in the primer film, and the mechanical properties of the primer film will be sufficiently secured. The content of silicon oxide is the remainder after the total content of other elements (in the case of oxides, the amount converted to the oxides) is excluded from the mass of the primer film.

From the viewpoint of the durability of the surface layer, it is preferred that the oxides in the primer film further contain at least one member of elements selected from alkali metal elements, alkaline earth metal elements, platinum group elements, boron, aluminum, phosphorus, titanium, zirconium, iron, nickel, chromium, molybdenum, and tungsten. When these elements are contained, the bond between the primer film and the above-mentioned present compound will be strengthened, and wear resistance will be improved.

In a case where the primer film contains at least one member selected from iron, nickel, and chromium, the total content of these is preferably from 10 to 1,100 mass ppm, more preferably from 50 to 1,100 mass ppm, further preferably from 50 to 500 mass ppm, particularly preferably from 50 to 250 mass ppm, as the proportion to silicon oxide.

In a case where the primer film contains at least one member selected from aluminum and zirconium, the total content of these is preferably from 10 to 2,500 mass ppm, more preferably from 15 to 2,000 mass ppm, further preferably from 20 to 1,000 mass ppm.

In a case where the primer film contains alkali metal elements, the total content of these elements is preferably from 0.05 to 15 mass %, more preferably from 0.1 to 13 mass %, further preferably from 1.0 to 10 mass %. Here, as the alkali metal elements, lithium, sodium, potassium, rubidium and cesium may be mentioned.

In a case where the primer film contains platinum group elements, the total content of these elements is preferably from 0.02 mass ppm to 800 mass ppm, more preferably from 0.04 mass ppm to 600 mass ppm, further preferably from 0.7 mass ppm to 200 mass ppm. Here, as the platinum group elements, platinum, rhodium, ruthenium, palladium, osmium and iridium may be mentioned.

In a case where the primer film contains at least one member selected from boron and phosphorus, the total content of these is, as the ratio of the total molar concentration of boron and phosphorus to the molar concentration of silicon, preferably from 0.003 to 9, more preferably from 0.003 to 2, further preferably from 0.003 to 0.5 from the viewpoint of the wear resistance of the surface layer.

In a case where the primer film contains alkaline earth metal elements, the total content of these elements is, as the ratio of the molar concentration of the total alkaline earth metal elements to the molar concentration of silicon, preferably from 0.005 to 5, more preferably from 0.005 to 2, further preferably from 0.007 to 2, from the viewpoint of the wear resistance of the surface layer. Here, as the alkaline earth elements, lithium, sodium, potassium, rubidium and cesium may be mentioned.

From the viewpoint of improving the adhesion of the fluorinated ether compound A and improving the water and oil repellency and wear resistance of the article, it is preferred that the primer film is a silicon oxide layer containing alkali metal atoms. In particular, in said silicon oxide layer, it is preferred that the average concentration of alkali metal atoms in a region with a depth of from 0.1 to 0.3 nm from the surface in contact with the surface layer is at least $2.0 \times 10^{19}$ atoms/cm$^3$. On the other hand, from the viewpoint of sufficiently securing the mechanical properties of the silicon oxide layer, it is preferred that the average value of the concentration of alkali metal atoms is at most $4.0 \times 10^{22}$ atoms/cm$^3$.

The thickness of the primer film is preferably from 1 to 200 nm, particularly preferably from 2 to 20 nm. When the thickness of the primer film is at least the lower limit value in the above range, it is easy to obtain a sufficient effect for the improvement of adhesiveness by the primer film. When the thickness of the primer film is at most the upper limit value in the above range, the wear resistance of the primer film itself will be high. As the method for measuring the thickness of the primer film, a method by cross-sectional observation of the primer film by an electron microscope (SEM, TEM, etc.), or a method of using an optical interference film thickness meter, a spectroscopic ellipsometer, a step meter, etc., may be mentioned.

As the base material, a base material for a touch panel, a base material for a display, or an eyeglass lens is suitable, and a base material for a touch panel is particularly suitable. As the material for the base material for a touch panel, glass or a transparent resin is preferred.

Further, as the base material, glass or a resin film to be used for an exterior portion (excluding the display portion) in devices such as cell phones (e.g. smartphones), mobile information terminals (e.g. tablets), game consoles and remote controls, is also preferred.

The surface layer contains groups (hereinafter referred to also as $R^f$) having —O— between carbon-carbon atoms of a fluoroalkyl group with two or more carbon atoms. That is, $R^f$ is a monovalent fluoroalkyl group having an etheric oxygen atom (—O—), and the number of carbon atoms therein is 2 or more.

As $R^f$, a fluoropolyether chain having a plurality of —O— between carbon-carbon atoms is preferred, from such a viewpoint that the fingerprint stain removability of the surface layer will be further excellent, and a perfluoropolyether chain is more preferred, from such a viewpoint that the friction resistance and fingerprint stain removability of the surface layer will be further excellent.

The surface layer is preferably one formed from a fluorinated ether compound A as described later, or a fluorinated ether composition containing the fluorinated ether compound A, from such a viewpoint that the fingerprint stain removability and friction resistance of the surface layer will be further excellent. The surface layer in this case contains a fluorinated ether compound A having $R^f$, in such a state that some or all of the hydrolyzable silyl groups of the fluorinated ether compound A have undergone a hydrolysis reaction and the silanol groups have undergone a dehydration condensation reaction.

The normalized F intensity in the surface layer is from 0.38 to 0.53, preferably from 0.38 to 0.51, more preferably from 0.40 to 0.50, particularly preferably from 0.42 to 0.48. When the normalized F intensity in the surface layer is at least the lower limit value in the above range, the fingerprint stain removability and friction resistance of the surface layer will be excellent. When the normalized F intensity in the surface layer is at most the upper limit value in the above range, the adhesion of the surface layer to the protective film will be excellent.

The normalized F intensity in the surface layer is measured by the following method. A glass containing a predetermined concentration of fluorine atoms is used as a standard sample. Using an X-ray fluorescence spectrometer, the fluorine atom intensity in the surface layer and the fluorine atom intensity in the standard sample, are measured, respectively. The normalized F intensity in the surface layer is calculated by dividing the fluorine atom intensity in the surface layer by the fluorine atom intensity in the standard sample. As the standard sample, a glass containing 4.96 mass % of fluorine atoms (IGS G4 Fluoride Opal Glass manufactured by Bureau of Analysed Samples Ltd.) is used. The measurement conditions are, for example, as follows: an X-ray fluorescence analyzer (manufactured by Rigaku, ZSX100e) is used, measurement diameter: 30 mm, measurement line: F-Kα, filter: OUT, slit: standard, spectral crystal: RX35 (manufactured by Rigaku), detector: PC, PHA: 100-300, peak angle: 38.794 deg. (20 sec), B.G. angle: 43.000 deg. (10 sec).

The normalized F intensity in the surface layer, for example, tends to become smaller, when the molecular weight of $R^f$ is lowered, and tends to become larger when the molecular weight of $R^f$ is increased.

Further, the normalized F intensity in the surface layer, for example, tends to become smaller when the proportion of fluorine atoms in $R^f$ is decreased and the proportion of hydrogen atoms is increased, and tends to become larger when the proportion of fluorine atoms in $R^f$ is increased and the proportion of hydrogen atoms is decreased.

Further, the normalized F intensity in the surface layer, for example, tends to become larger when the proportion of reactive silyl groups (T) to $R^f$ in fluorinated ether compound A (e.g. the ratio of b/a in compound (1)) is decreased and the proportion of $R^f$ is increased, and tends to become smaller when the proportion of reactive silyl groups (T) to $R^f$ is increased and the proportion of $R^f$ is decreased.

The molecular weight of $R^f$ is preferably from 1,500 to 4,000, more preferably from 1,500 to 3,500, particularly preferably from 2,000 to 3,500. When the molecular weight of $R^f$ is at least the lower limit value in the above range, the fingerprint stain removability and friction resistance of the surface layer will be excellent. When the molecular weight of $R^f$ is at most the upper limit value in the above range, the adhesion of the surface layer to the protective film will be excellent.

The thickness of the surface layer is preferably from 1 to 100 nm, particularly preferably from 1 to 50 nm. When the thickness of the surface layer is at least the lower limit value in the above range, the effect by the surface treatment will be easily sufficiently obtained. When the thickness of the surface layer is at most the upper limit value in the above range, the utilization efficiency will be high. The thickness of the surface layer can be calculated from the oscillation period of the interference pattern by obtaining the interference pattern of reflected X-rays by the X-ray reflection method using an X-ray diffractometer for thin film analysis (ATX-G manufactured by RIGAKU).

The surface layer formed by using the present composition is excellent in adhesiveness to the protective film. The reason for this is considered to be such that since the density of oxyfluoroalkylene chains in the surface layer is small, the surface tension has increased, and the peelability from the adhesive that the protective film has, has decreased. The protective film may be a resin film with an adhesive. As the adhesive, an acrylic adhesive, an urethane adhesive and a silicone adhesive may be mentioned, and an acrylic adhesive is preferred from the viewpoint of being readily peelable. As the resin film, a polyvinyl chloride film, a polyethylene film, a polypropylene film, a polycarbonate film, a polyester film and a polyurethane film may be mentioned, and a polyvinyl chloride film, a polyethylene film and a polypropylene film are preferred from the viewpoint of being readily peelable.

The article with a surface layer of the present invention can be produced, for example, by the following methods.

A method in which the surface of a base material is treated by a dry coating method using a fluorinated ether compound A as described later, a fluorinated ether composition containing the fluorinated ether compound A, or a coating liquid containing the fluorinated ether compound A or the fluorinated ether composition (preferably using a fluorinated ether compound A or a fluorinated ether composition containing the fluorinated ether compound A), to form a surface layer formed from the fluorinated ether compound A or the fluorinated ether composition, on the surface of the base material.

A method in which by a wet coating method using a fluorinated ether compound A, a fluorinated ether composition containing the fluorinated ether compound A, or a coating liquid containing the fluorinated ether compound A or the fluorinated ether composition (preferably, a coating liquid containing the fluorinated ether compound A or the fluorinated ether composition), the fluorinated ether compound A or the like is applied on the surface of a base material and dried to form a surface layer formed from the fluorinated ether compound A or the fluorinated ether composition, on the surface of the base material.

As the dry coating method, a technique such as vacuum deposition, CVD, sputtering or the like may be mentioned. As the dry coating method, the vacuum deposition method is preferred from the viewpoint of suppressing the decomposition of the fluorinated ether compound A and from the viewpoint of simplicity of the equipment. At the time of vacuum deposition, a pellet-form material having the fluorinated ether compound A or the fluorinated ether composition impregnated in a metal porous body of iron, steel, etc., may be used. A pellet-form material having the fluorinated ether compound A or the fluorinated ether composition impregnated by impregnating a coating liquid in a metal porous body of iron, steel, etc. and drying the liquid medium, may be used.

As the wet-coating method, a spin-coating method, a wipe-coating method, a spray-coating method, a squeegee-coating method, a dip-coating method, a die-coating method, an ink-jet method, a flow-coating method, a roll-coating method, a casting method, a Langmuir-Blodgett method, a gravure-coating method, etc., may be mentioned.

(Fluorinated Ether Compound A)

The fluorinated ether compound A is a compound having $R^f$ and a reactive silyl group.

The fluorinated ether compound A has $R^f$ at the terminal. The fluorinated ether compound A having $R^f$ can form a surface layer excellent in fingerprint stain removability.

The fluorinated ether compound A has a reactive silyl group at the terminal. The fluorinated ether compound A having a reactive silyl group at the terminal can form a surface layer excellent in friction resistance because of its strong chemical bonding to the base material.

$R^f$ is preferably a fluoropolyether chain having a plurality of —O— between carbon-carbon atoms, since the fingerprint stain removability of the surface layer will be further excellent, more preferably a perfluoropolyether chain, since the friction resistance and fingerprint stain removability of the surface layer will be further excellent.

The reactive silyl group may be a group in which one or both of a hydrolyzable group and a hydroxy group are bonded to a silicon atom. As the reactive silyl group, for example, T in the formula (1) as described below, i.e. —Si(R)$_{3-c}$(L)$_c$, may be mentioned.

As the fluorinated ether compound A, a compound (1) is preferred, since the friction resistance and fingerprint stain removability of the surface layer will be further excellent.

[R$^f$—]$_a$Q[-T]$_b$              (1)

Here, $R^f$ is a group having —O— between carbon-carbon atoms of a fluoroalkyl group with 2 or more carbon atoms (provided that at least one fluorine atom is bonded to the terminal carbon atom on the Q side), and when there are two or more $R^f$, the two or more $R^f$ may be the same or different; Q is an a+b-valent linking group; T is —Si(R)$_{3-c}$(L)$_c$, and when there are two or more T, the two or more T may be the same or different. R is an alkyl group, L is a hydrolyzable group or a hydroxy group, two or more L in T may be the same or different, a is an integer of at least 1, b is an integer of at least 1, and c is 2 or 3.

The compound (1) has $R^f$ at the terminal. The compound (1) having $R^f$ at the terminal can form a surface layer excellent in fingerprint stain removability.

The compound (1) has a reactive silyl group at the terminal. The compound (1) having a reactive silyl group at the terminal can form a surface layer excellent in friction resistance, because of its strong chemical bonding with the base material.

a is preferably from 1 to 6, more preferably from 1 to 4, particularly preferably 1 or 2, from such a viewpoint that the production of the compound (1) will be easy and from such a viewpoint that the friction resistance and fingerprint stain removability of the surface layer will be further excellent.

b is preferably from 2 to 20, more preferably from 3 to 10, particularly preferably 4 to 8, from such a viewpoint that the production of the compound (1) will be easy and from such a viewpoint that the balance of the friction resistance, fingerprint stain removability, and adhesion to the protective film, of the surface layer, will be excellent.

When the normalized F intensity in the surface layer is reduced to improve the adhesion of the surface layer to the protective film, the friction resistance of the surface layer decreases, but by increasing the number of b, i.e. the number of reactive silyl groups, it will be easy to maintain the friction resistance of the surface layer.

As $R^f$, a group (g1) is preferred from such a viewpoint that the fingerprint stain removability of the surface layer will be further excellent.

$R^{f1}$—(OR$^{f2}$)$_m$—              (g1)

Here, $R^{f1}$ is a C$_{1-6}$ fluoroalkyl group, and $R^{f2}$ is a C$_{1-6}$ fluoroalkylene group (provided that at least one fluorine atom is bonded to the terminal carbon atom on the Q side of $R^{f2}$ that is bonded to Q), and m is an integer of at least 1, and when m is 2 or more, (OR$^{f2}$)$_m$ may be composed of two or more types of OR$^{f2}$.

When the number of carbon atoms in $R^{f1}$ is from 1 to 6, the friction resistance and fingerprint stain removability of the surface layer will be further excellent. The number of carbon atoms in the fluoroalkyl group of $R^{f1}$ is preferably from 1 to 4, particularly preferably from 1 to 3, from such a viewpoint that the friction resistance and fingerprint stain removability of the surface layer will be further excellent.

As $R^{f1}$, a perfluoroalkyl group is preferred, from such a viewpoint that the friction resistance and fingerprint stain removability of the surface layer will be further excellent. The compound (1) in which $R^{f1}$ is a perfluoroalkyl group, has $CF_3$— at the terminal. According to the compound (1) whose terminal is $CF_3$—, it is possible to form a surface layer with low surface energy, and thus the friction resistance and fingerprint stain removability of the surface layer will be further excellent.

As $R^{f1}$, $CF_3$—, $CF_3CF_2$—, $CF_3CF_2CF_2$—, $CF_3CF_2CF_2CF_2$—, $CF_3CF_2CF_2CF_2CF_2$—, $CF_3CF_2CF_2CF_2CF_2CF_2$—, $CF_3CF(CF_3)$—, etc. may be mentioned.

When the number of carbon atoms in $R^{f2}$ is from 1 to 6, the friction resistance and fingerprint stain removability of the surface layer will be further excellent.

$R^{f2}$ may be linear, branched, or cyclic. As $R^{f2}$, a linear fluoroalkylene group is preferred, since the friction resistance and fingerprint stain removability of the surface layer will be further excellent.

As $R^{f2}$, a perfluoroalkylene group is preferred, from such a viewpoint that the friction resistance and fingerprint stain removability of the surface layer will be further excellent.

The proportion of perfluoroalkylene groups among the total $R^{f2}$ is preferably from 60 to 100 mol %, more preferably from 80 to 100 mol %, particularly preferably 100 mol %, from such a viewpoint that the friction resistance and fingerprint stain removability of the surface layer will be further excellent.

m is preferably an integer of from 1 to 50, more preferably an integer of from 4 to 40, particularly preferably an integer of from 5 to 30. When m is at least the lower limit value in the above range, the friction resistance and fingerprint stain removability of the surface layer will be further excellent. When m is at most the upper limit value in the above range, the adhesion of the surface layer to the protective film will be further excellent.

As $OR^{f2}$, i.e. an oxyfluoroalkylene unit, $OCHF$, $OCF_2CHF$, $OCHFCF_2$, $OCF_2CH_2$, $OCH_2CF_2$, $OCF_2CF_2CHF$, $OCHFCF_2CF_2$, $OCF_2CF_2CH_2$, $OCH_2CF_2CF_2$, $OCF_2CF_2CF_2CH_2$, $OCH_2CF_2CF_2CF_2$, $OCF_2CF_2CF_2CF_2CH_2$, $OCH_2CF_2CF_2CF_2CF_2$, $OCF_2CF_2CF_2CF_2CF_2CH_2$, $OCH_2CF_2CF_2CF_2CF_2CF_2$, $OCF_2$, $OCF_2CF_2$, $OCF_2CF_2CF_2$, $OCF(CF_3)CF_2$, $OCF_2CF_2CF_2CF_2$, $OCF(CF_3)CF_2CF_2$, $OCF_2CF_2CF_2CF_2CF_2$, $OCF_2CF_2CF_2CF_2CF_2CF_2$, —O-cyclo$C_4F_6$—, —O-cyclo$C_5F_8$—, —O-cyclo$C_6F_{10}$—, etc., may be mentioned.

Here, -cyclo$C_4F_6$— means a perfluorocyclobutanediyl group, a specific example of which may be a perfluorocyclobutane-1,2-diyl group. -cyclo$C_5F_8$— means a perfluorocyclopentanediyl group, a specific example of which may be perfluorocyclopentane-1,3-diyl group. -cyclo$C_6F_{10}$— means a perfluorocyclohexanediyl group, a specific example of which may be a perfluorocyclohexane-1,4-diyl group.

In $(OR^{f2})_m$, when two or more types of $OR^{f2}$ are present, the bonding order of the respective $OR^{f2}$ is not limited. For example, when $OCF_2$ and $OCF_2CF_2$ are present, $OCF_2$ and $OCF_2CF_2$ may be arranged randomly, alternately, or in blocks.

Two or more types of $OR^{f2}$ being present means that two or more types of $OR^{f2}$ different in the number of carbon atoms are present, two or more types of $OR^{f2}$ different in the number of hydrogen atoms are present, two or more types of $OR^{f2}$ different in positions of hydrogen atoms are present, and two or more types of $OR^{f2}$ different in the presence or absence of side chains and in the type of side chains (the number of side chains, the number of carbon atoms in the side chains, etc.) are present even if the carbon number is the same.

With respect to the arrangement of two or more types of $OR^{f2}$, for example, the structure represented by $\{(OCF_2)_{m1}(OCF_2CF_2)_{m2}\}$ shows that m1 ($OCF_2$) and m2 ($OCF_2CF_2$) are randomly arranged. Further, the structure represented by $(OCF_2CF_2$—$OCF_2CF_2CF_2CF_2)_{m5}$ shows that m5 ($OCF_2CF_2$) and m5 ($OCF_2CF_2CF_2CF_2$) are alternately arranged.

As $(OR^{f2})_m$, it is preferably one having the following structure at least at a part of it.

$\{(OCF_2)_{m1}(OCF_2CF_2)_{m2}\}$,
$(OCF_2CF_2)_{m3}$,
$(OCF_2CF_2CF_2)_{m4}$,
$(OCF_2CF_2$—$OCF_2CF_2CF_2CF_2)_{m5}$,
$(OCF_2CF_2CF_2CF_2CF_2)_{m6}(OCF_2)_{m7}$,
$(OCF_2CF_2CF_2CF_2CF_2)_{m6}(OCF_2CF_2)_{m7}$,
$(OCF_2CF_2CF_2CF_2CF_2CF_2)_{m6}(OCF_2)_{m7}$,
$(OCF_2CF_2CF_2CF_2CF_2CF_2)_{m6}(OCF_2CF_2)_{m7}$,
$(OCF_2CF_2CF_2CF_2CF_2$—$OCF_2)_{m8}$,
$(OCF_2CF_2CF_2CF_2CF_2$—$OCF_2CF_2)_{m8}$,
$(OCF_2CF_2CF_2CF_2CF_2CF_2$—$OCF_2)_{m8}$,
$(OCF_2CF_2CF_2CF_2CF_2CF_2$—$OCF_2CF_2)_{m8}$,
$(OCF_2$—$OCF_2CF_2CF_2CF_2CF_2)_{m8}$,
$(OCF_2$—$OCF_2CF_2CF_2CF_2CF_2CF_2)_{m8}$,
$(OCF_2CF_2$—$OCF_2CF_2CF_2CF_2CF_2)_{m8}$,
$(OCF_2CF_2$—$OCF_2CF_2CF_2CF_2CF_2CF_2)_{m8}$,
$(OCF(CF_3)CF_2)_{m9}$,
(—O-cyclo$C_4F_6$—)$_{m10}$,
(—O-cyclo$C_5F_8$—)$_{m10}$,
(—O-cyclo$C_6F_{10}$—)$_{m10}$.

Here, m1, m2, m3, m4, m5, m6, m7, m8, m9 and m10 are integers of at least 1. The upper limits of m1, m2, m3, m4, m5, m6, m7, m8, m9 and m10 are adjusted according to the upper limit of m.

As $(OR^{f2})_m$, the following are preferred from such a viewpoint that the compound (1) can be easily produced.

$\{(OCF_2)_{m1}(OCF_2CF_2)_{m2}\}OCF_2$,
$(OCF_2CF_2)_{m3}OCF_2$,
$(OCF_2CF_2CF_2)_{m4}OCF_2CF_2$,
$(OCF_2CF_2)_2\{(OCF_2)_{m1}(OCF_2CF_2)_{m2}\}OCF_2$,
$(OCF_2CF_2$—$OCF_2CF_2$ $CF_2CF_2)_{m5}OCF_2CF_2OCF_2CF_2CF_2$,
$(OCF_2$—$OCF_2CF_2CF_2$ $CF_2CF_2)_{m8}OCF_2OCF_2CF_2CF_2CF_2$,
$(OCF_2$—$OCF_2CF_2CF_2CF_2$ $CF_2CF_2)_{m8}OCF_2OCF_2CF_2CF_2CF_2CF_2$,
$(OCF_2CF_2$—$OCF_2CF_2CF_2$ $CF_2CF_2)_{m8}OCF_2CF_2OCF_2CF_2CF_2CF_2$,
$(OCF_2CF_2$—$OCF_2CF_2CF_2CF_2$ $CF_2CF_2)_{m8}OCF_2CF_2OCF_2CF_2CF_2CF_2CF_2$,
$(OCF(CF_3)CF_2)_{m9}OCF(CF_3)$.

In particular, in $\{(CF_2O)_{m1}(CF_2CF_2O)_{m2}\}$, m2/m1 is preferably from 0.1 to 10, more preferably from 0.2 to 5.0, further preferably from 0.2 to 2.0, particularly preferably from 0.2 to 1.5, most preferably from 0.2 to 0.85, from such a viewpoint that the friction resistance and finger print stain removability of the surface layer will be further excellent.

Q is an a+b valent linear or branched linking group. Q is preferably free of fluorine atoms.

When a+b is 3 or more, it is preferred that Q further has at least one branching point (hereinafter referred to as "branching point P") selected from the group consisting of C, N, Si, a ring structure, and an a+b-valent organopolysiloxane residue. Here, to the branching point P, a chain having $R^f$ or T in the chain is bonded.

As the ring structure, one type selected from the group consisting of a 3- to 8-membered aliphatic ring, a 3- to 8-membered aromatic ring, a 3- to 8-membered heterocycle, and a fused ring consisting of two or more of these rings, is preferred from such a viewpoint that the compound (1) can easily be produced and from such a viewpoint that the friction resistance, light resistance and chemical resistance of the surface layer will be further excellent, and ring structures listed in the following formulas are particularly preferred. The ring structure may have a substituent such as a halogen atom, an alkyl group (which may contain an etheric oxygen atom between carbon-carbon atoms), a cycloalkyl group, an alkenyl group, an allyl group, an alkoxy group, an oxo group (=O), etc.

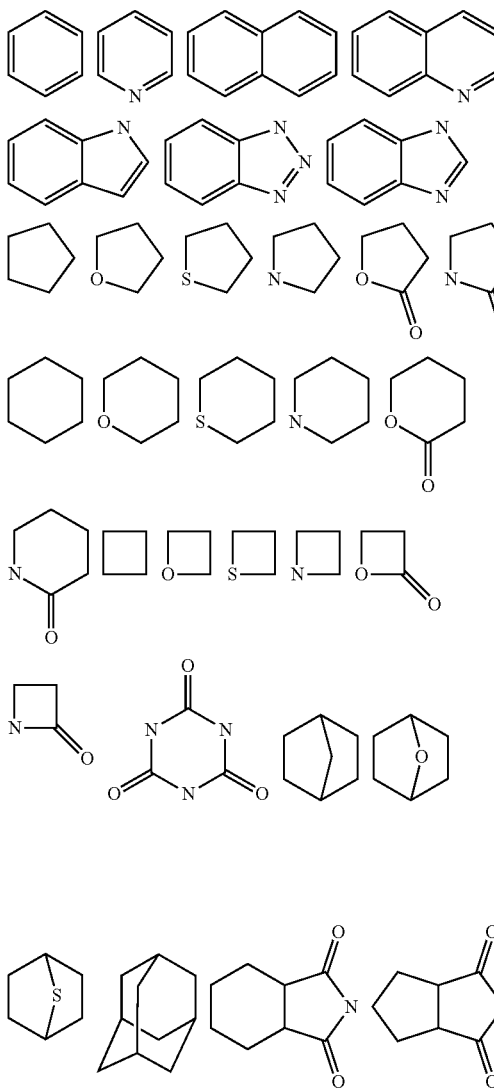

As the a+b-valent organopolysiloxane residue, for example, groups of the following formulas may be mentioned. Here, $R^5$ in the following formulas is a hydrogen atom, an alkyl group, an alkoxy group, or a phenyl group. The number of carbon atoms in the alkyl group and the alkoxy group for $R^5$ is preferably from 1 to 10, particularly preferably 1.

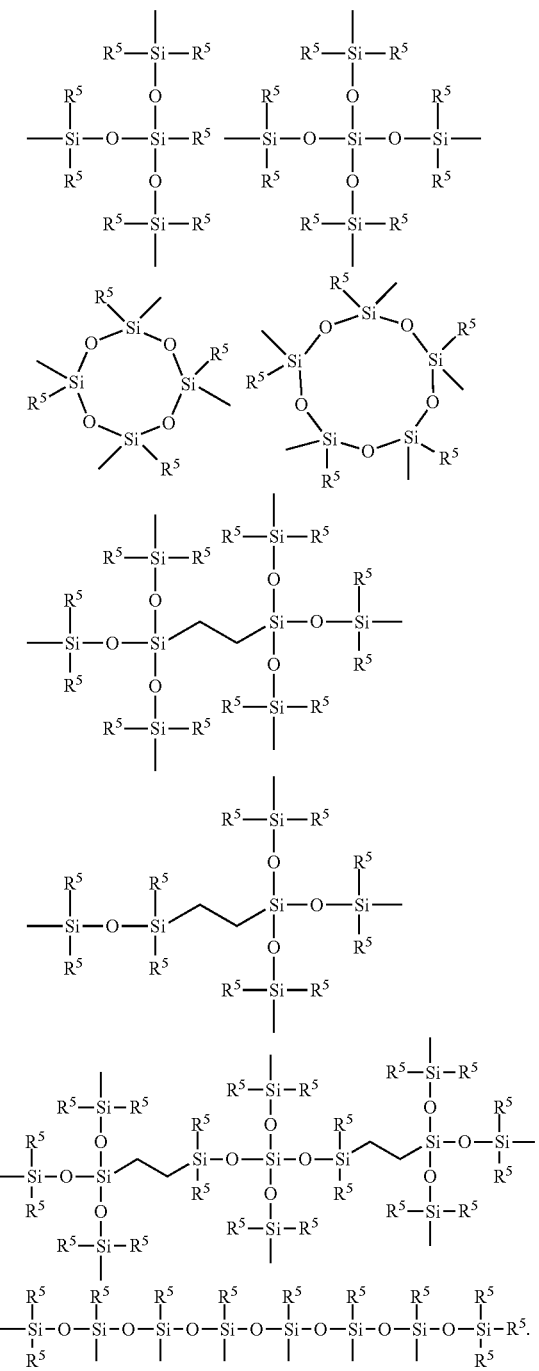

Q may further have at least one type of bond (hereinafter referred to as "bond B") selected from the group consisting of —C(O)NR$^6$—, —NR$^6$C(O)—, —C(O)O—, —OC(O)—, —C(O)—, —O—, —NR$^6$—, —S—, —NHC(O)O—, —OC(O)—NH—, —NHC(O)NR$^6$—, —NR$^6$C(O)NH—, —SO$_2$NR$^6$—, —NR$^6$SO$_2$—, —Si(R$^6$)$_2$—, —OSi(R$^6$)$_2$—, —Si(CH$_3$)$_2$-Ph-Si(CH$_3$)$_2$— and a divalent organopolysiloxane residue. Here, $R^6$ is a hydrogen atom, a $C_{1-6}$ alkyl group, or a phenyl group, and Ph is a phenylene group. The number of carbon atoms in the alkyl group for $R^6$ is preferably from 1 to 3, particularly preferably 1 or 2, from such a viewpoint that the compound (1) can easily be produced.

As the divalent organopolysiloxane residue, for example, groups of the following formulas may be mentioned. Here, $R^7$ in the following formulas is a hydrogen atom, an alkyl group, an alkoxy group, or a phenyl group. The number of carbon atoms in the alkyl group and the alkoxy group for $R^7$ is preferably from 1 to 10, particularly preferably 1.

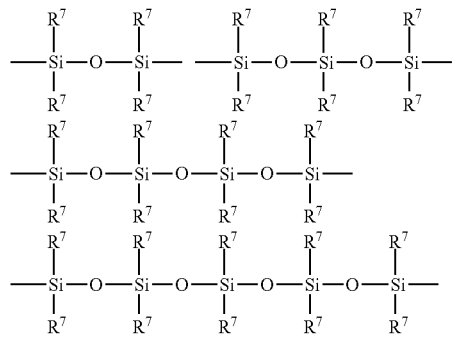

As the bond B, at least one type of bond selected from the group consisting of —C(O)NR$^6$—, —C(O)—, —NR$^6$— and —O— is preferred from such a viewpoint that the compound (1) can be easily produced, and —C(O)NR$^6$— or —C(O)— is particularly preferred, from such a viewpoint that the light resistance and chemical resistance of the surface layer will be further excellent.

As Q, a combination of two or more divalent hydrocarbon groups and at least one branch point P, or a combination of two or more divalent hydrocarbon groups, at least one branch point P and at least one bond B, may be mentioned.

The divalent hydrocarbon group may have a substituent such as a hydroxy group, an alkoxy group, etc. The divalent hydrocarbon group may be a divalent aliphatic hydrocarbon group (an alkylene group, a cycloalkylene group, etc.), a divalent aromatic hydrocarbon group (a phenylene group, etc.), etc. The number of carbon atoms in the divalent hydrocarbon group is preferably from 1 to 10, more preferably from 1 to 6, particularly preferably from 1 to 4.

As Q in the above combination, group (g2-1) (where a=d1+d3, and b=d2+d4), group (g2-2) (where a=e1 and b=e2), group (g2-3) (where a=1, and b=2), group (g2-4) (where a=h1, and b=h2), group (g2-5) (where a=i1, and b=i2), and group (g2-6) (where a=1, and b=1), are preferred.

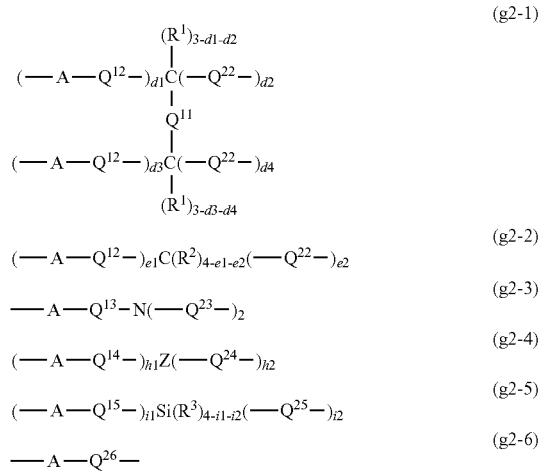

Here, in the formulas (g2-1) to (g2-6), the A side is bonded to $R^f$, and the $Q^{22}$, $Q^{23}$, $Q^{24}$, $Q^{25}$ or $Q^{26}$ side is bonded to T; A is a single bond, —C(O)NR$^6$—, —C(O)—, —O— or —SO$_2$NR$^6$—; $Q^{11}$ is a single bond, —O—, an alkylene group, or a group having —C(O)NR$^6$—, —C(O)—, —NR$^6$— or —O— between carbon-carbon atoms of an alkylene group with two or more carbon atoms; $Q^{12}$ is a single bond, an alkylene group, or a group having —C(O)NR$^6$—, —C(O)—, —NR$^6$— or —O— between carbon-carbon atoms of an alkylene group with two or more carbon atoms; when Q has two or more $Q^{12}$, the two or more $Q^{12}$ may be the same or different; $Q^{13}$ is a single bond (but, A is limited to —C(O)—), an alkylene group, a group having —C(O)NR$^6$—, —C(O)—, —NR$^6$— or —O— between carbon-carbon atoms of an alkylene group with two or more carbon atoms, or a group having —C(O)— at the terminal on the N side of an alkylene group; $Q^{14}$ is $Q^{12}$ when the atom in Z to which $Q^{14}$ is bonded is a carbon atom, and $Q^{13}$ when the atom in Z to which $Q^{14}$ is bonded is a nitrogen atom; when Q has two or more $Q^{14}$, the two or more $Q^{14}$ may be the same or different; $Q^{15}$ is an alkylene group, or a group having —C(O)NR$^6$—, —C(O)—, —NR$^6$— or —O— between carbon-carbon atoms of an alkylene group with two or more carbon atoms; when Q has two or more $Q^{15}$, the two or more $Q^{15}$ may be the same or different; $Q^{22}$ is an alkylene group, a group having —C(O)NR$^6$—, —C(O)—, —NR$^6$— or —O— between carbon-carbon atoms of an alkylene group with two or more carbon atoms, a group having —C(O)NR$^6$—, —C(O)—, —NR$^6$— or —O— at the terminal of the alkylene group on the side not connected to Si, or a group having —C(O)NR$^6$—, —C(O)—, —NR$^6$— or —O— between carbon-carbon atoms of an alkylene group with two or more carbon atoms and having —C(O)NR$^6$—, —C(O)—, —NR$^6$— or —O— at the terminal on the side not connected to Si; when Q has two or more $Q^{22}$, the two or more $Q^{22}$ may be the same or different; $Q^{23}$ is an alkylene group, or a group having —C(O)NR$^6$—, —C(O)—, —NR$^6$— or —O— between carbon-carbon atoms of an alkylene group with two or more carbon atoms; the two $Q^{23}$ may be the same or different; $Q^{24}$ is $Q^{22}$ when the atom in Z to which $Q^{24}$ is bonded is a carbon atom, and is $Q^{23}$ when the atom in Z to which $Q^{24}$ is bonded is a nitrogen atom; when Q has two or more $Q^{24}$, the two or more $Q^{24}$ may be the same or different; $Q^{25}$ is an alkylene group, or a group having —C(O)NR$^6$—, —C(O)—, —NR$^6$— or —O— between carbon-carbon atoms of an alkylene group with two or more carbon atoms; when Q has two or more $Q^{25}$, the two or more $Q^{25}$ may be the same or different; $Q^{26}$ is an alkylene group, or a group having —C(O)NR$^6$—, —C(O)—, —NR$^6$— or —O— between carbon-carbon atoms of an alkylene group with two or more carbon atoms; Z is a group having an a+b valent ring structure having a carbon atom and a nitrogen atom to which $Q^{14}$ is directly bonded, and having a carbon atom and a nitrogen atom to which $Q^{24}$ is directly bonded; $R^1$ is a hydrogen atom or an alkyl group; when Q has two or more $R^1$, the two or more $R^1$ may be the same or different; $R^2$ is a hydrogen atom, a hydroxy group, an alkyl group or an acyloxy group; $R^3$ is an alkyl group; $R^6$ is a hydrogen atom, a C$_{1-6}$ alkyl group or a phenyl group; d1 is an integer of from 0 to 3, preferably 1 or 2; d2 is an integer of from 0 to 3, preferably 1 or 2; d1+d2 is an integer of from 1 to 3; d3 is an integer of from 0 to 3, preferably 0 or 1; d4 is an integer of from 0 to 3, preferably 2 or 3; d3+d4 is an integer of from 1 to 3; d1+d3 is an integer of from 1 to 5, preferably 1 or 2, d2+d4 is an integer of from 1 to 5, preferably an integer of from 3 to 5; e1 is an integer or from 1 to 3, preferably 1 or 2; e2 is an integer of from 1 to 3, preferably 2 or 3; e1+e2 is 3 or 4; h1 is an integer of at least 1, preferably 1 or 2; h2 is an integer of at least 1, preferably 2 or 3; i1 is an integer of from 1 to 3, preferably 1 or 2; i2 is an integer of from 1 to 3, preferably 2 or 3; and i1+i2 is 3 or 4.

The number of carbon atoms in the alkylene group for $Q^{11}$, $Q^{12}$, $Q^{13}$, $Q^{14}$, $Q^{15}$, $Q^{22}$, $Q^{23}$, $Q^{24}$, $Q^{25}$ and $Q^{26}$ is preferably from 1 to 10, more preferably from 1 to 6, particularly preferably from 1 to 4, from such a viewpoint that the compound (1) can easily be produced and from such a viewpoint that the friction resistance, light resistance and chemical resistance of the surface layer will be further excellent. However, the lower limit of the number of carbon atoms in the alkylene group in the case of having a specific bond between carbon-carbon atoms, is 2.

The ring structure in Z may be the ring structure described above, and its preferred form is also the same. Since $Q^{14}$ and $Q^{24}$ are directly bonded to the ring structure in Z, there will be no possibility such that, for example, an alkylene group is connected to the ring structure, and $Q^{14}$ or $-Q^{24}$ is connected to the alkylene group.

The number of carbon atoms in the alkyl groups for $R^1$, $R^2$ and $R^3$ is preferably from 1 to 6, more preferably from 1 to 3, particularly preferably 1 or 2, from such a viewpoint that the compound (1) can easily be produced.

The number of carbon atoms in the alkyl group portion of the acyloxy group for $R^2$ is preferably from 1 to 6, more preferably from 1 to 3, particularly preferably 1 or 2, from such a viewpoint that the compound (1) can easily be produced.

h1 is preferably from 1 to 6, more preferably from 1 to 4, further preferably 1 or 2, particularly preferably 1, from such a viewpoint that the compound (1) can easily be produced and from such a viewpoint that the friction resistance and fingerprint stain removability of the surface layer will be further excellent.

h2 is preferably from 2 to 6, more preferably from 2 to 4, particularly preferably 2 or 3, from such a viewpoint that the compound (1) can easily be produced and from such a viewpoint that the friction resistance and fingerprint stain removability of the surface layer will be further excellent.

Other forms of Q may be group (g2-7) (where a=d1+d3 and b=sum of k), group (g2-8) (where a=e1 and b=e2), group (g2-9) (where a=1 and b=sum of k), group (g2-10) (where a=h1 and b=sum of k), group (g2-11) (where a=i1 and b=sum of k), and group (g2-12) (where a=1 and b=k).

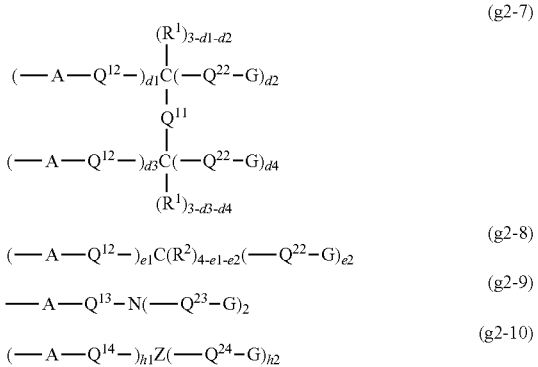

Here, in the formulas (g2-7) to (g2-12), the A side is bonded to $R^f$, the G side is bonded to T, G is the group (g3), the two or more G that Q has, may be the same or different, and the symbols other than G are the same as the symbols in the formula (g2-1) and the formula (g2-6).

$$-Si(R^8)_{3-k}(-Q^3-)_k \qquad (g3)$$

Here, in the formula (g3), the Si side is bonded to $Q^{22}$, $Q^{23}$, $Q^{24}$, $Q^{25}$ or $Q^{26}$; the $Q^3$ side is bonded to T; $R^8$ is an alkyl group; $Q^3$ is an alkylene group, a group having $-C(O)NR^6-$, $-C(O)-$, $-NR^6-$ or $-O-$ between carbon-carbon atoms of an alkylene group with two or more carbon atoms, or $-(OSi(R^9)_2)_p-O-$; two or more $Q^3$ may be the same or different; k is 2 or 3; $R^6$ is a hydrogen atom, a $C_{1-6}$ alkyl group or a phenyl group; $R^9$ is an alkyl group, a phenyl group or an alkoxy group; the two $R^9$ may be the same or different; p is an integer from 0 to 5; and when p is 2 or more, the two or more $(OSi(R^9)_2)$ may be the same or different.

The number of carbon atoms in the alkylene group for $Q^3$ is preferably from 1 to 10, more preferably from 1 to 6, particularly preferably from 1 to 4, from such viewpoint that the compound (1) can easily be produced and from such a viewpoint that the friction resistance, light resistance and chemical resistance of the surface layer will be further excellent. However, the lower limit of the number of carbon atoms in the alkylene group in the case of having a specific bond between carbon-carbon atoms, is 2.

The number of carbon atoms in the alkyl group for $R^8$ is preferably 1 to 6, more preferably from 1 to 3, particularly preferably 1 or 2, from such a viewpoint that the compound (1) can easily be produced.

The number of carbon atoms in the alkyl group for $R^9$ is preferably 1 to 6, more preferably from 1 to 3, particularly preferably 1 or 2, from such a viewpoint that the compound (1) can easily be produced.

The number of carbon atoms in the alkoxy group for $R^9$ is preferably 1 to 6, more preferably from 1 to 3, particularly preferably 1 or 2, from such a viewpoint that the storage stability of the compound (1) will be excellent.

p is preferably 0 or 1.

T is $-Si(R)_{3-c}(L)_c$, which is a reactive silyl group.

The number of carbon atoms in the alkyl group for R is preferably 1 to 6, more preferably from 1 to 3, particularly preferably 1 or 2, from such a viewpoint that the compound (1) can easily be produced.

The hydrolyzable group for L is a group that becomes a hydroxy group by a hydrolysis reaction. That is, the hydrolyzable silyl group becomes a silanol group (Si—OH) by the hydrolysis reaction. The silanol group further undergoes a dehydration-condensation reaction between molecules to form a Si—O—Si bond. The silanol group also reacts with the hydroxy group (base material-OH) at the surface of the base material by a dehydration-condensation reaction to form a chemical bond (base material-O—Si).

The hydrolyzable group may, for example, be an alkoxy group, an aryloxy group, a halogen atom, an acyl group, an acyloxy group, or an isocyanate group. As the alkoxy group, a $C_{1-6}$ alkoxy group is preferred. As the halogen atom, a chlorine atom is preferred. As the acyl group, a $C_1$-6 acyl group is preferred. As the acyloxy group, a $C_{1-6}$ acyloxy group is preferred.

As L, an alkoxy group or a halogen atom is preferred from such a viewpoint that the compound (1) can easily be produced. As L, a $C_1$-4 alkoxy group is preferred from such a viewpoint that outgassing during coating is less, and the storage stability of the compound (1) will be excellent; and when long-term storage stability of the compound (1) is required, an ethoxy group is particularly preferred, and when the reaction time after coating is required to be short, a methoxy group is particularly preferred.

c is particularly preferably 3, from such a viewpoint that adhesion between the surface layer and the base material will be stronger.

The plurality of T in the compound (1) may be the same or different. It is preferred that they are the same group, from such a viewpoint that the compound (1) can easily be produced.

As the compound (1), for example, compounds of the following formulas may be mentioned. The compounds of the following formulas are preferred from such a viewpoint that they can easily be industrially produced and are easy to handle, and the water and oil repellency, friction resistance, fingerprint stain removability, chemical resistance, light resistance and chemical resistance of the surface layer will be further excellent, and the light resistance will be particularly excellent. $R^f$ in the compounds of the following formulas is the same as $R^f$ in the formula (1) as described above, and the preferred form is also the same.

As the compound (1) in which Q is group (g2-1), for example, compounds of the following formulas may be mentioned.

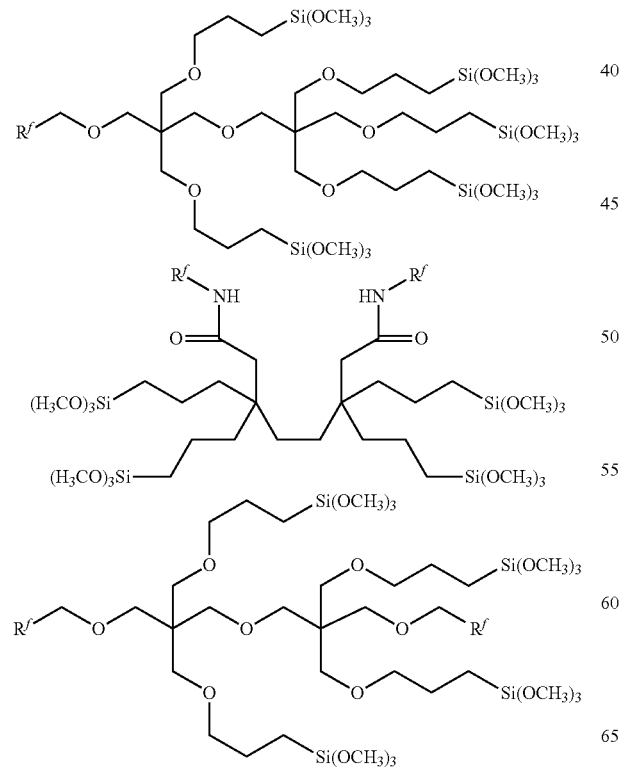

As the compound (1) in which Q is group (g2-2), for example, compounds of the following formulas may be mentioned.

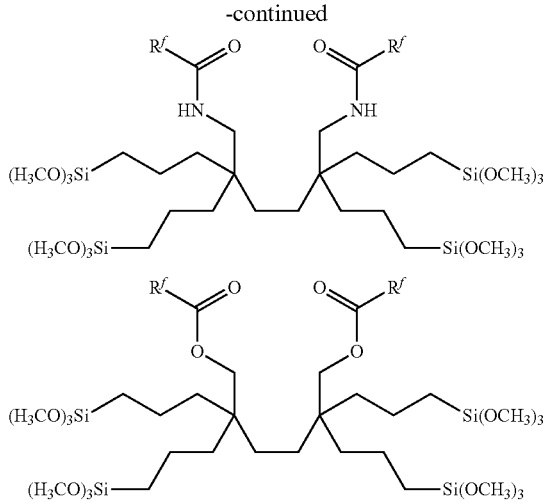

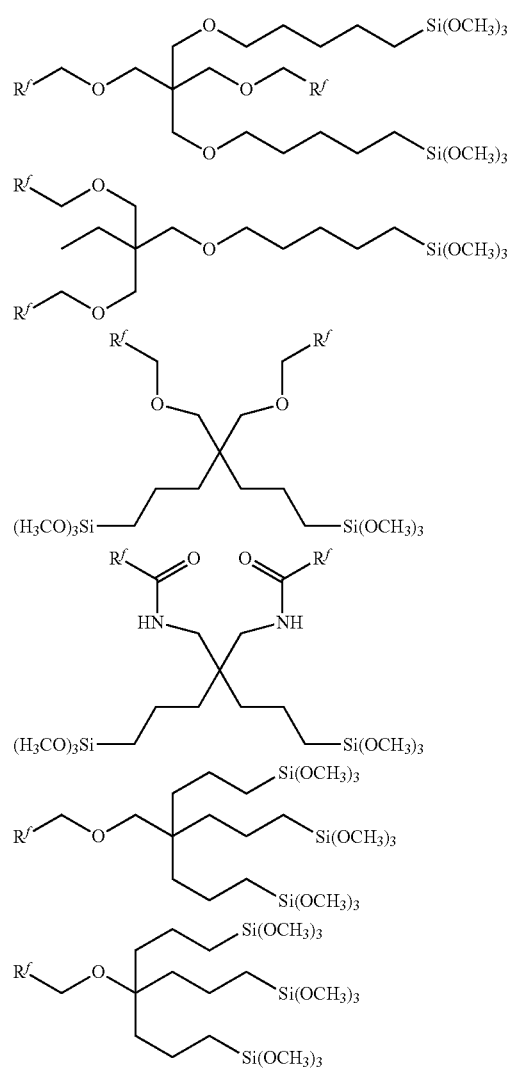

-continued
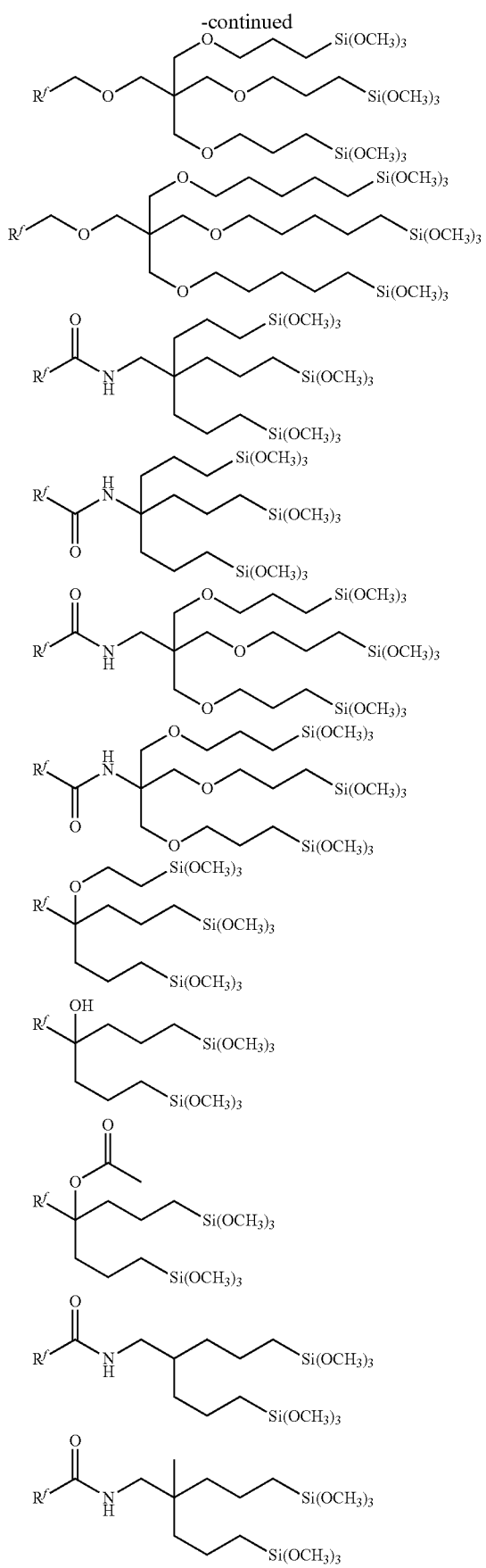
-continued
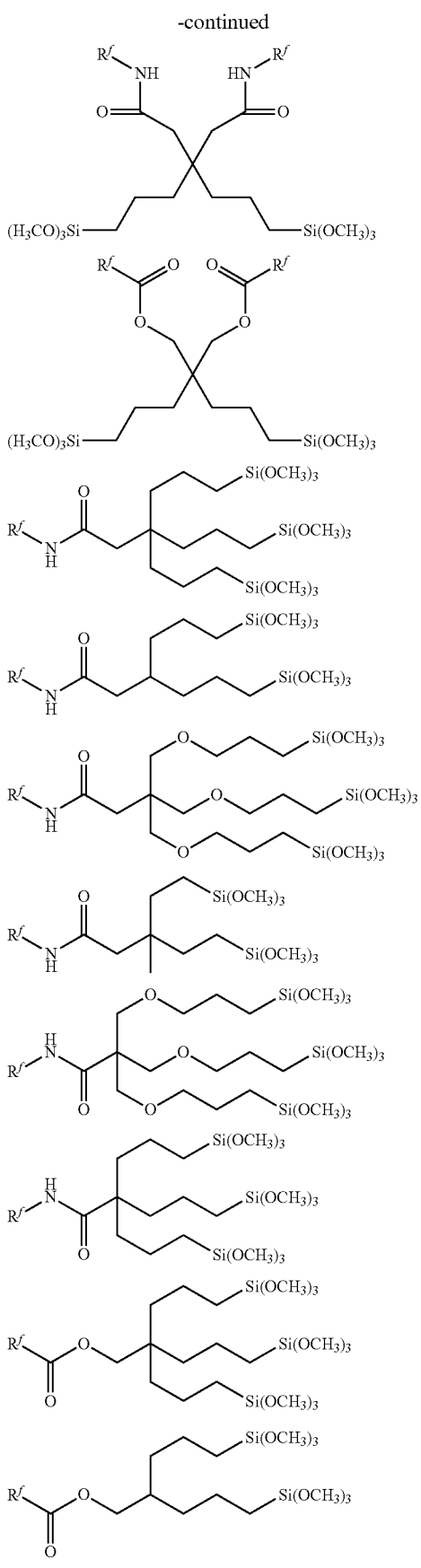

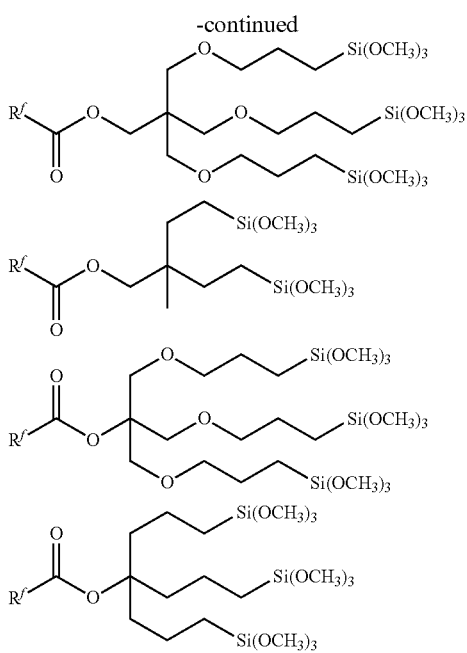
As the compound (1) in which Q is group (g2-3), for example, compounds of the following formulas may be mentioned.
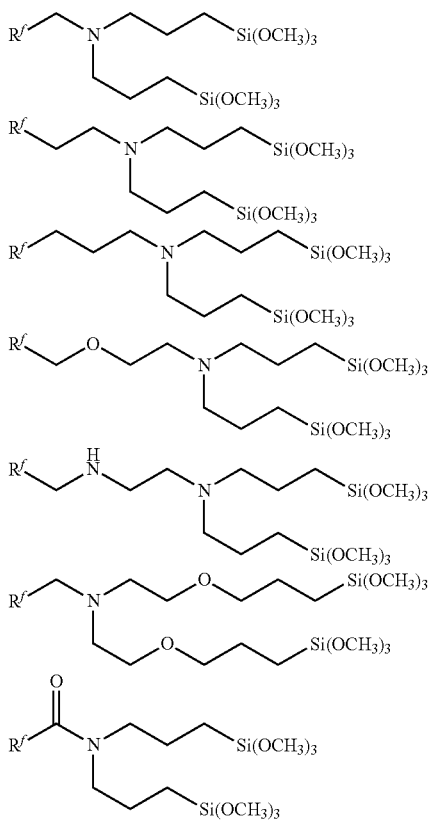
As the compound (1) in which Q is group (g2-4), for example, compounds of the following formulas may be mentioned.
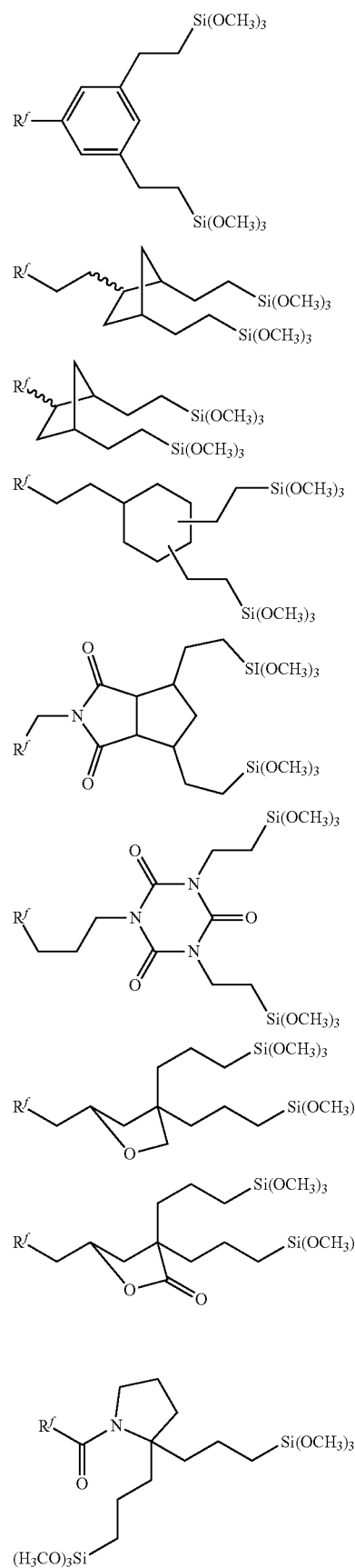

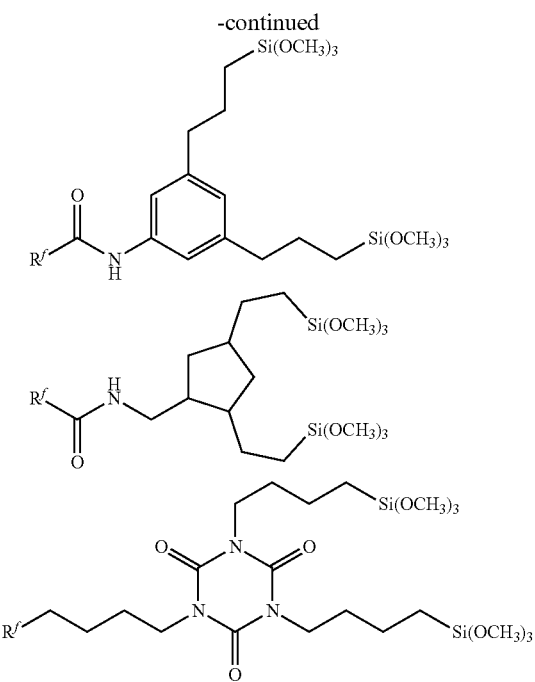
As the compound (1) in which Q is group (g2-5), for example, compounds of the following formulas may be mentioned.
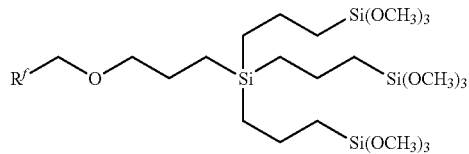
As the compound (1) in which Q is group (g2-6), for example, compounds of the following formulas may be mentioned.
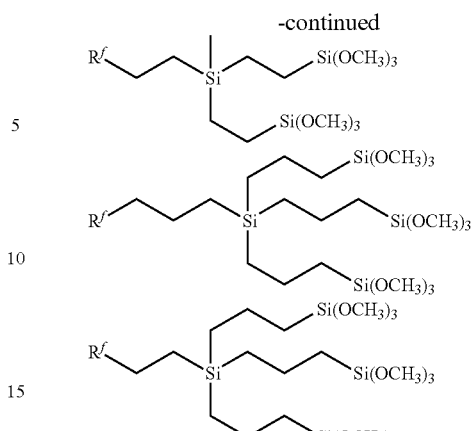
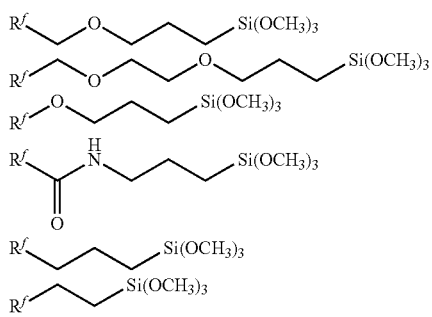
As the compound (1) in which Q is group (g2-7), for example, compounds of the following formulas may be mentioned.
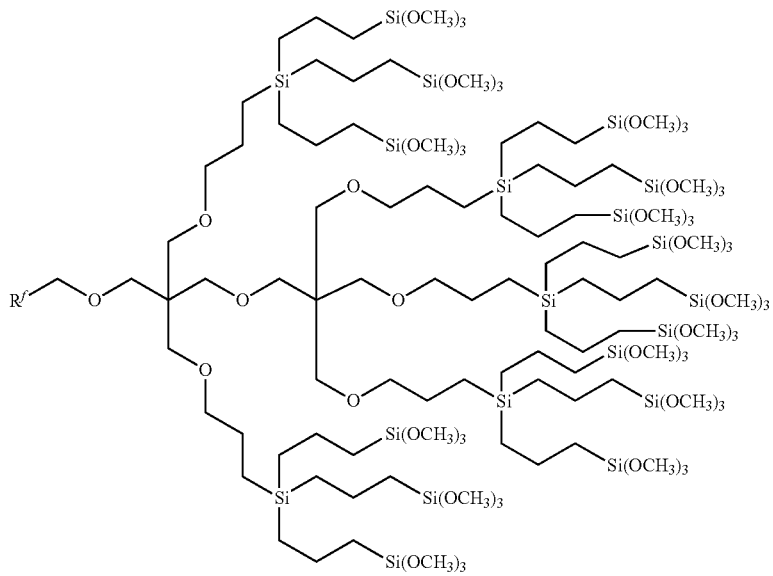

-continued
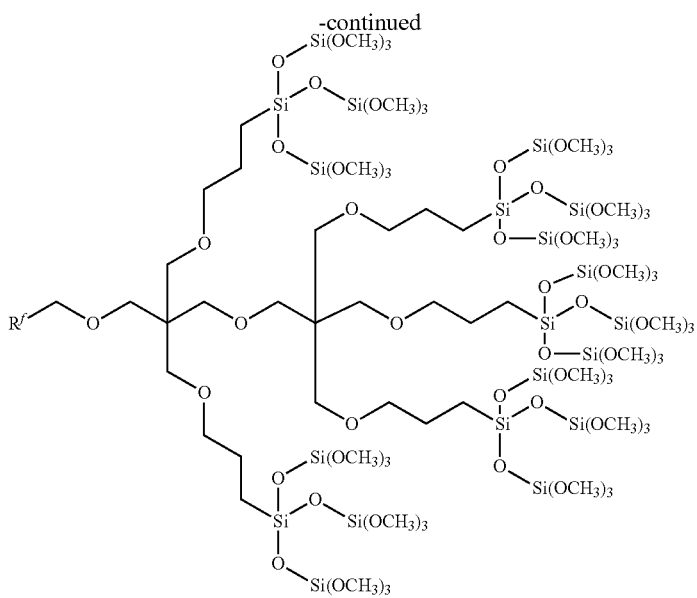
As the compound (1) in which Q is group (g2-8), for example, compounds of the following formulas may be mentioned.
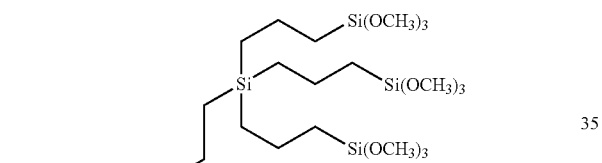
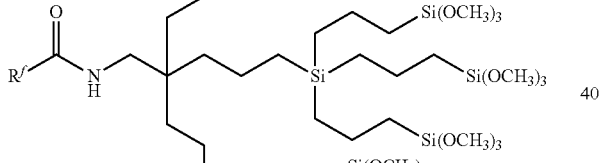
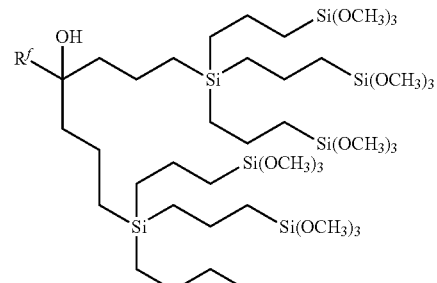
-continued
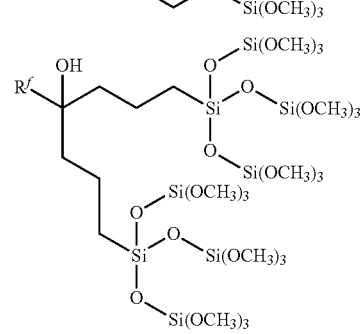
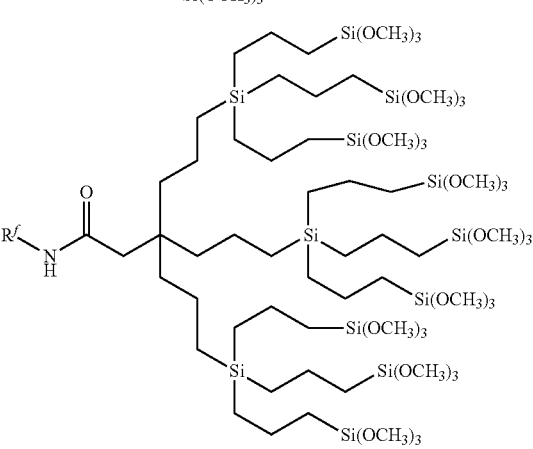

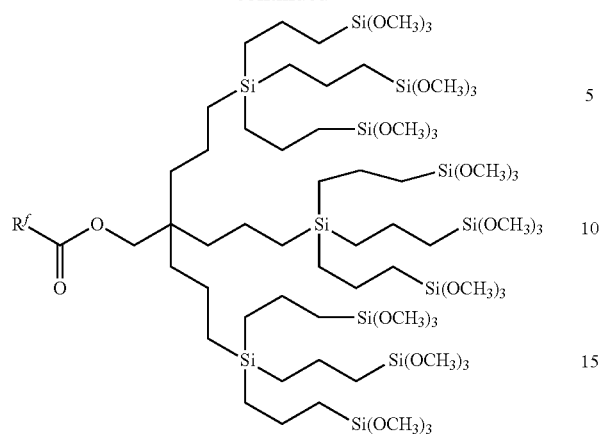
As the compound (1) in which Q is group (g2-9), for example, compounds of the following formulas may be mentioned.
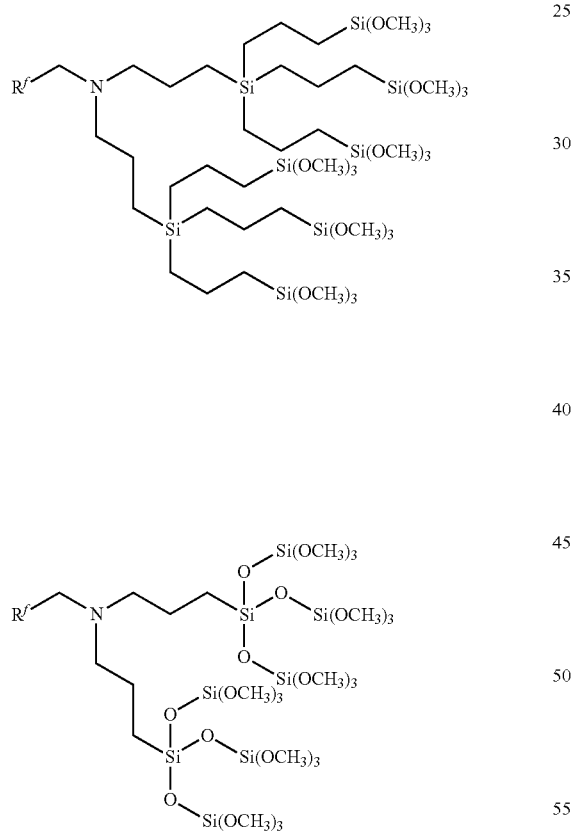
As the compound (1) in which Q is group (g2-10), for example, compounds of the following formulas may be mentioned.
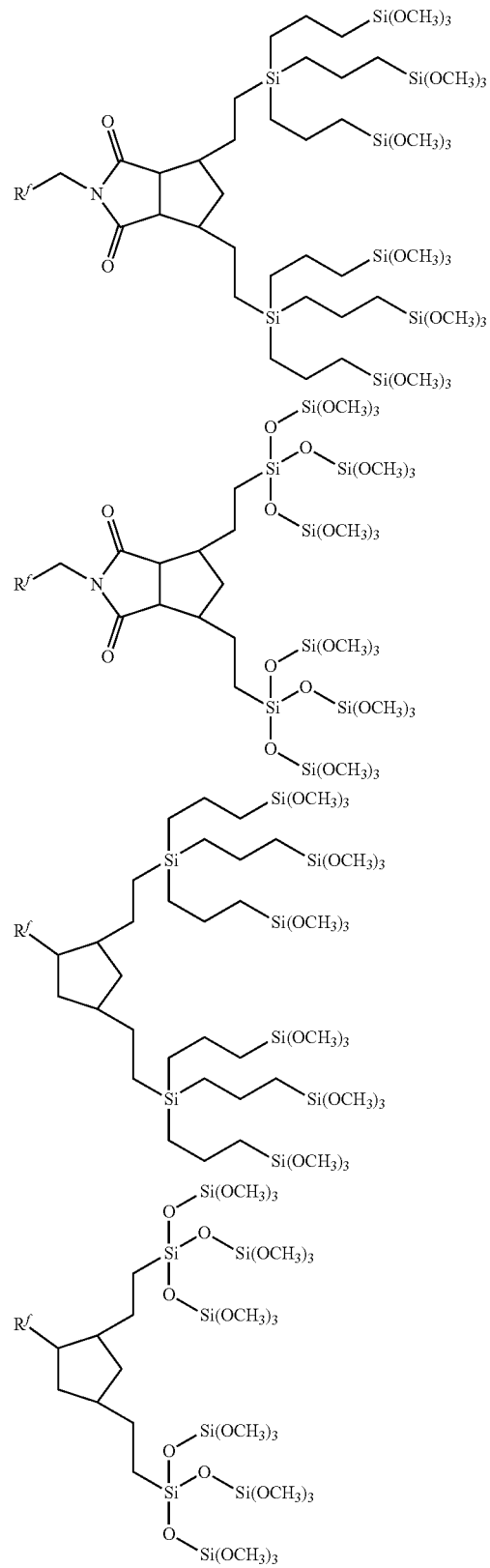
As the compound (1) in which Q is group (g2-11), for example, compounds of the following formulas may be mentioned.

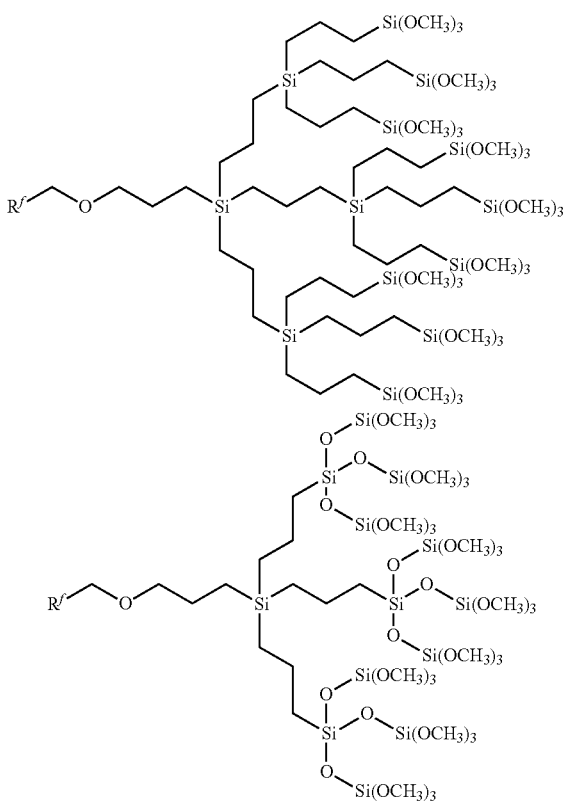

As the compound (1) in which Q is group (g2-12), for example, compounds of the following formulas may be mentioned.

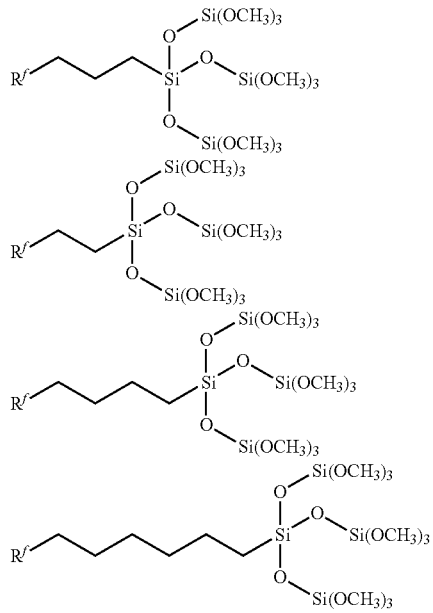

The compound (1) may be produced, for example, by a method of subjecting compound (2) and compound (3a) or compound (3b) to a hydrosilylation reaction.

$$[R^f\!\!-\!]_a Q^1[\!\!-\!CH\!\!=\!\!CH_2]_b \tag{2}$$

Here, in the formula (2), $Q^1$ is an a+b valent linking group, and the symbols other than $Q^1$ are the same as the symbols in the formula (1).

$Q^1[\!\!-\!CH\!\!=\!\!CH_2]_b$ becomes Q in the compound (1) after the hydrosilylation. $Q^1$ may be a group similar to Q, and the preferred form is also similar.

$$HSi(R)_{3-c}(L)_c \tag{3a}$$

$$HSi(R^8)_{3-k}[\!\!-\!(OSi(R^9)_2)_p\!\!-\!O\!\!-\!Si(R)_{3-c}(L)_c]_k \tag{3b}$$

Here, the symbols in the formula (3a) and the formula (3b) are the same as the symbols in the formula (1) and the formula (g3). Compound (3b) can be produced, for example, by the method described in the specification of Japanese Patent Application No. 2018-085493.

As $Q^1[\!\!-\!CH\!\!=\!\!CH_2]_b$, group (g4-1) (where a=d1+d3, and b=d2+d4), group (g4-2) (where a=e1, and b=e2), group (g4-3) (where a=1, and b=2), group (g4-4) (where a=h1, and b=h2), group (g4-5) (where a=i1, and b=i2), or group (g4-6) (where a=1, and b=1), is preferred.

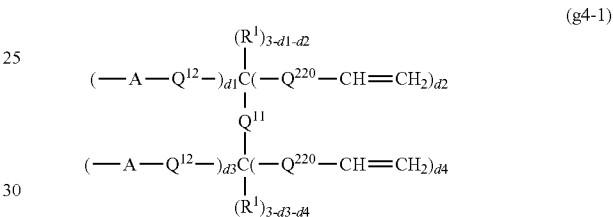

$$(\!\!-\!A\!\!-\!Q^{12}\!\!-\!)_{e1}C(R^2)_{4-e1-e2}(\!\!-\!Q^{220}\!\!-\!CH\!\!=\!\!CH_2)_{e2} \tag{g4-2}$$

$$-\!A\!\!-\!Q^{13}\!\!-\!N(\!\!-\!Q^{230}\!\!-\!CH\!\!=\!\!CH_2)_2 \tag{g4-3}$$

$$(\!\!-\!A\!\!-\!Q^{14}\!\!-\!)_{h1}Z(\!\!-\!Q^{240}\!\!-\!CH\!\!=\!\!CH_2)_{h2} \tag{g4-4}$$

$$(\!\!-\!A\!\!-\!Q^{15}\!\!-\!)_{i1}Si(R^3)_{4-i1-i2}(\!\!-\!Q^{250}\!\!-\!CH\!\!=\!\!CH_2)_{i2} \tag{g4-5}$$

$$-\!A\!\!-\!Q^{260}\!\!-\!CH\!\!=\!\!CH_2 \tag{g4-6}$$

Here, $Q^{220}$ is an alkylene group, a group having —C(O)NR$^6$—, —C(O)—, —NR$^6$— or —O— between carbon-carbon atoms of an alkylene group with two or more carbon atoms, a group having —C(O)NR$^6$—, —C(O)—, —NR$^6$— or —O— at the terminal of an alkylene group not bonded to Si, or a group having —C(O)NR$^6$—, —C(O)—, —NR$^6$— or —O— between carbon-carbon atoms of an alkylene group with two or more carbon atoms, and having —C(O)NR$^6$—, —C(O)—, —NR$^6$— or —O— at the terminal on the side not connected to Si; when $Q^1$ has two or more $Q^{220}$, the two or more $Q^{220}$ may be the same or different; $Q^{230}$ is an alkylene group or a group having —C(O)NR$^6$—, —C(O)—, —NR$^6$— or —O— between carbon-carbon atoms of an alkylene group having two or more carbon atoms; the two $Q^{230}$ may be the same or different; $Q^{240}$ is $Q^{220}$ when the atom in Z to which $Q^{240}$ is bonded is a carbon atom, and $Q^{230}$ when the atom in Z to which $Q^{240}$ is bonded is a nitrogen atom; when $Q^1$ has two or more $Q^{240}$, the two or more $Q^{240}$ may be the same or different; $Q^{250}$ is an alkylene group, or a group having —C(O)NR$^6$—, —C(O)—, —NR$^6$— or —O— between carbon-carbon atoms of an alkylene group having two or more carbon atoms; when $Q^1$ has two or more $Q^{250}$, the two or more $Q^{250}$ may be the same or different; $Q^{260}$ is an alkylene group or a group having —C(O)NR$^6$—, —C(O)—, —NR$^6$— or —O— between carbon-carbon atoms of an alkylene group with two or more carbon atoms; and the symbols other than $Q^{220}$, $Q^{230}$, $Q^{240}$, $Q^{250}$ and $Q^{260}$, are the same as the symbols in the formula (g2-1) to the formula (g2-6).

$Q^{220}$-CH=CH$_2$ becomes $Q^{22}$ in the compound (1) after the hydrosilylation. $Q^{220}$ may be a group similar to $Q^{22}$, and the preferred form is also similar.

$Q^{230}$-CH=CH$_2$ becomes $Q^{23}$ in the compound (1) after the hydrosilylation. $Q^{230}$ may be a group similar to $Q^{23}$, and the preferred form is also similar.

$Q^{240}$-CH=CH$_2$ becomes $Q^{24}$ in the compound (1) after the hydrosilylation. $Q^{240}$ may be a group similar to $Q^{24}$, and the preferred form is also similar.

$Q^{250}$-CH=CH$_2$ becomes $Q^{25}$ in the compound (1) after the hydrosilylation. $Q^{250}$ may be a group similar to $Q^{25}$, and the preferred form is also similar.

$Q^{260}$-CH=CH$_2$ becomes $Q^{26}$ in the compound (1) after the hydrosilylation. $Q^{260}$ may be a group similar to $Q^{26}$, and the preferred form is also similar.

Other forms of $Q^1$[—CH=CH$_2$]$_b$ may be group (g4-7) (where a=d1+d3 and b=sum of k), group (g4-8) (where a=e1 and b=sum of k), group (g4-9) (where a=1 and b=sum of k), group (g4-10) (where a=h1 and b=sum of k), group (g4-11) (where a=i1 and b=sum of k), or group (g4-12) (where a=1 and b=k).

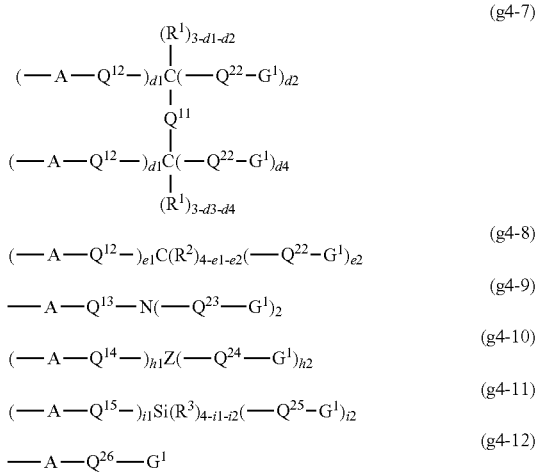

Here, $G^1$ is group (g5); two or more $G^1$ that $Q^1$[—CH=CH$_2$]b has, may be the same or different; and the symbols other than G1are the same as the symbols in the formula (g2-1) to the formula (g2-6).

$$—Si(R^8)_{3-k}(-Q^{30}-CH=CH_2)_k \quad (g5)$$

Here, $Q^{30}$ is an alkylene group, or a group having —C(O)NR$^6$—, —C(O)—, —NR$^6$— or —O— between carbon-carbon atoms of an alkylene group with two or more carbon atoms; two or more $Q^{30}$ may be the same or different; and the symbols other than $Q^{30}$ are the same as the symbols in the formula (g3).

$Q^{30}$-CH=CH$_2$ becomes $Q^3$ in group (g3) after the hydrosilylation. $Q^{30}$ may be a group similar to $Q^3$ (but excluding —(OSi(R$^9$)$_2$)$_p$—O—), and the preferred form is also similar.

Compound (2) in which $Q^1$[—CH=CH$_2$]$_b$ is group (g4-1), can be produced, for example, by the method described in Patent Document 2.

Compound (2) in which $Q^1$[—CH=CH$_2$]$_b$ is group (g4-2), can be produced, for example, by the method described in JP-A-2015-199906, the method described in JP-A-2016-037541, the method described in JP-A-2016-204656, the method described in JP-A-2016-222859, the method described in WO2017/038830, the method described in Patent Document 2, or the method described in Japanese Patent Application No. 2017-159696.

Compound (2) in which $Q^1$[—CH=CH$_2$]$_b$ is group (g4-3), can be produced, for example, by the method described in Patent Document 1.

Compound (2) in which $Q^1$[—CH=CH$_2$]$_b$ is group (g4-4), can be produced, for example, by the method described in the specification of Japanese Patent Application No. 2017-159698.

Compound (2) in which $Q^1$[—CH=CH$_2$]$_b$ is group (g4-5) can be produced, for example, by the method described in JP-A-2016-037541, or the method described in WO2016/121211.

Compound (2) in which $Q^1$[—CH=CH$_2$]$_b$ is group (g4-6), can be produced, for example, by the method described in JP-A-2012-072272, the method described in WO2013/121984, or the method described in WO2013/121986.

Compound (2) in which $Q^1$[—CH=CH$_2$]$_b$ is group (g4-7) to group (g4-12) can be produced, for example, by the method described in the specification of Japanese Patent Application No. 2017-251611.

(Fluorinated Ether Composition)

The fluorinated ether composition contains at least one type of the fluorinated ether compound A and other fluorinated compounds.

Other fluorinated compounds may be fluorinated ether compounds in which a reactive silyl group is bonded via a connecting group at both terminals of a group having —O— between carbon-carbon atoms of a fluoroalkylene group with two or more carbon atoms, fluorinated ether compounds that are formed as byproducts during the production process of the fluorinated ether compound A (hereinafter also referred to as "byproduct fluorinated ether compounds"), known fluorinated compounds to be used for the same applications as the fluorinated ether compound A, etc.

As other fluorinated compounds, compounds that are less likely to degrade the properties of the fluorinated ether compound A, are preferred.

Byproduct fluorinated ether compounds may be unreacted compound (2) and fluorinated ether compounds in which some of the allyl groups are isomerized to inner olefins at the time of the hydrosilylation in the production of the compound (1).

The known fluorinated compounds may be fluorinated compounds that are commercially available as surface treating agents. When the fluorinated ether composition contains a known fluorinated compound, there may be a case where a new action effect such as supplementing the properties of the fluorinated ether compound A is demonstrated.

The content of the fluorinated ether compound A in the fluorinated ether composition is preferably at least 60 mass % and less than 100 mass %, more preferably at least 70 mass % and less than 100 mass %, particularly preferably at least 80 mass % and less than 100 mass %.

The content of other fluorinated compounds in the fluorinated ether composition is preferably more than 0 mass % and at most 40 mass %, more preferably more than 0 mass % and at most 30 mass %, particularly preferably more than 0 mass % and at most 20 mass %.

The total of the content of the fluorinated ether compound A and the content of other fluorinated compounds in the fluorinated ether composition is preferably from 80 to 100 mass %, particularly preferably from 85 to 100 mass %.

When the content the of the fluorinated ether compound A and the content of other fluorinated compounds are within the above ranges, the friction resistance, fingerprint stain removability, light resistance and chemical resistance of the surface layer will be further excellent.

The fluorinated ether composition may contain components other than the fluorinated ether compound A and other fluorinated compounds to such an extent that the effects of the invention will not be impaired.

Other components may be byproducts formed in the production process of the fluorinated ether compound A (but excluding byproduct fluorinated ether compounds), compounds that are unavoidable in the production, such as unreacted raw materials, etc.

Further, other components may be additives such as acid catalysts and basic catalysts that promote hydrolysis and condensation reactions of hydrolyzable silyl groups. The acid catalysts include hydrochloric acid, nitric acid, acetic acid, sulfuric acid, phosphoric acid, sulfonic acid, methanesulfonic acid, p-toluenesulfonic acid, etc. The basic catalysts include sodium hydroxide, potassium hydroxide, ammonia, etc.

The content of other components in the fluorinated ether composition is preferably from 0 to 9.999 mass %, particularly preferably from 0 to 0.99 mass %.

(Coating Liquid)

The coating liquid contains a fluorinated ether compound A or a fluorinated ether composition and a liquid medium. The coating liquid may be a solution or a dispersion.

As the liquid medium, an organic solvent is preferred. The organic solvent may be a fluorinated organic solvent or a non-fluorinated organic solvent, or may contain both solvents.

The fluorinated organic solvent may be a fluorinated alkane, a fluorinated aromatic compound, a fluoroalkyl ether, a fluorinated alkylamine, a fluoroalcohol, etc.

As the fluorinated alkane, a $C_{4-8}$ compound is preferred. As commercial products, $C_6F_{13}H$ (manufactured by AGC Inc., ASAHIKLIN (registered trademark) AC-2000), $C_6F_{13}C_2H_5$ (manufactured by AGC Inc., ASAHIKLIN (registered trademark) AC-6000), $C_2F_5CHFCHFCF_3$ (manufactured by Chemours, VERTREL (registered trademark) XF), etc. may be mentioned.

As the fluorinated aromatic compound, hexafluorobenzene, trifluoromethylbenzene, perfluorotoluene, bis(trifluoromethyl)benzene, etc. may be mentioned.

As the fluoroalkyl ether, a $C_{4-12}$ compound is preferred. As commercial products, $CF_3CH_2OCF_2CF_2H$ (manufactured by AGC Inc., ASAHIKLIN (registered trademark) AE-3000), $C_4F_9OCH_3$ (manufactured by 3M, Novec (registered trademark) 7100), $C_4F_9O\ C_2H_5$ (manufactured by 3M, Novec (registered trademark) 7200), $C_2F_5CF(OCH_3)C_3F_7$ (manufactured by 3M, Novec (registered trademark) 7300), etc. may be mentioned.

As the fluorinated alkylamine, perfluorotripropylamine, perfluorotributylamine, etc. may be mentioned.

As the fluoroalcohol, 2,2,3,3-tetrafluoropropanol, 2,2,2-trifluoroethanol, hexafluoroisopropanol, etc. may be mentioned.

As the non-fluorinated organic solvent, a compound consisting only of hydrogen atoms and carbon atoms, or a compound consisting only of hydrogen atoms, carbon atoms and oxygen atoms, is preferred, and a hydrocarbon, an alcohol, a ketone, an ether or an ester may be mentioned.

The liquid medium may be a mixture having two or more types of media mixed.

The content of the fluorinated ether compound A or the fluorinated ether composition in the coating liquid is preferably from 0.001 to 10 mass %, particularly preferably from 0.01 to 1 mass %.

The content of the liquid medium in the coating liquid is preferably from 90 to 99.999 mass %, particularly preferably from 99 to 99.99 mass %.

EXAMPLES

In the following, the present invention will be described in more detail with reference to Examples, but the present invention is not limited to these Examples. In the following, "%" means "mass %" unless otherwise specified. Ex. 1 to 4 and 9 to 12 are Examples of the present invention, and Ex. 5 to 8 and 13 to 16 are Comparative Examples.

Ex. 1

Compound (4-1) was obtained by referring to the method described in Ex. 7 in Examples in WO2013/121984. The average value of x is 6.

$$CF_3-(OCF_2CF_2-OCF_2CF_2CF_2CF_2)_xOCF_2CF_2-OCF_2CF_2CF_2-CH_2-OH \quad (4\text{-}1)$$

Compound (1-1) was obtained in the same manner as in Ex. 1 of Patent Document 2, except that $R^f$—$CH_2$—OH in Ex. 1 of Patent Document 2 was changed to compound (4-1). The average value of x is 6. The molecular weight of $R^f$ is 2,400.

(1-1)

$$R^f=CF_3-(OCF_2CF_2-OCF_2CF_2CF_2CF_2)_xOCF_2CF_2-OCF_2OF_2CF_2-$$

Ex. 2

Compound (4-2) was obtained by referring to the method described in Ex. 7 in Examples in WO2013/121984. The average value of x is 9.

$$CF_3-(OCF_2CF_2-OCF_2CF_2CF_2CF_2)_xOCF_2CF_2-OCF_2CF_2CF_2-CH_2-OH \quad (4\text{-}2)$$

Compound (1-2) was obtained in the same manner as in Ex. 1 of Patent Document 2, except that $R^f$—$CH_2$—OH in Ex. 1 of Patent Document 2 was changed to compound (4-2). The average value of x is 9. The molecular weight of $R^f$ is 3,400.

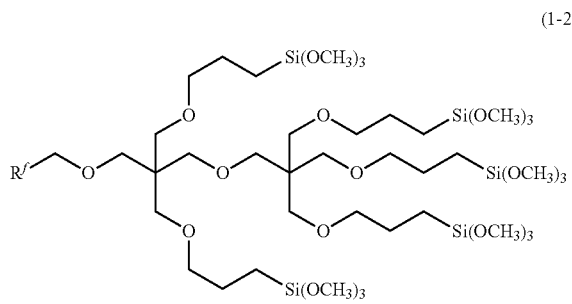
(1-2)

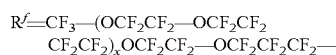
$R^f=CF_3-(OCF_2CF_2-OCF_2CF_2CF_2CF_2)_xOCF_2CF_2-OCF_2CF_2CF_2-$

Ex. 3

Compound (4-3) was obtained by referring to the method described in Ex. 11 of WO2013/121984. The average value of x1 is 7, and the average value of x2 is 8.

$CF_3CF_2CF_2-\{(OCF_2)_{x1}(OCF_2CF_2)_{x2}\}OCF_2-CH_2-OH$ (4-3)

Compound (1-3) was obtained in the same manner as in Ex. 1 of Patent Document 2, except that $R^f-CH_2-OH$ in Ex. 1 of Patent Document 2 was changed to compound (4-3). The average value of x1 is 7, and the average value of x2 is 8. The molecular weight of $R^f$ is 1,900.

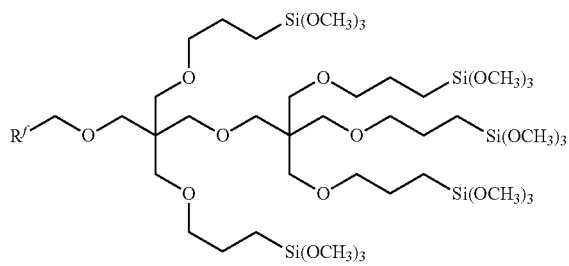
(1-3)

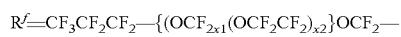
$R^f=CF_3CF_2CF_2-\{(OCF_{2x1}(OCF_2CF_2)_{x2}\}OCF_2-$

Ex. 4

Compound (4-4) was obtained by referring to the method described in Ex. 9 of WO2018/043166. The average value of x is 15.

$CF_3CF_2CF_2-\{OCF(CF_3)CF_2\}_xOCF(CF_3)-CH_2-OH$ (4-4)

Compound (1-4) was obtained in the same manner as in Ex. 1 of Patent Document 2, except that $R^f-CH_2-OH$ in Ex. 1 of Patent Document 2 was changed to compound (4-4). The average value of x is 15. The molecular weight of $R^f$ is 2,900.

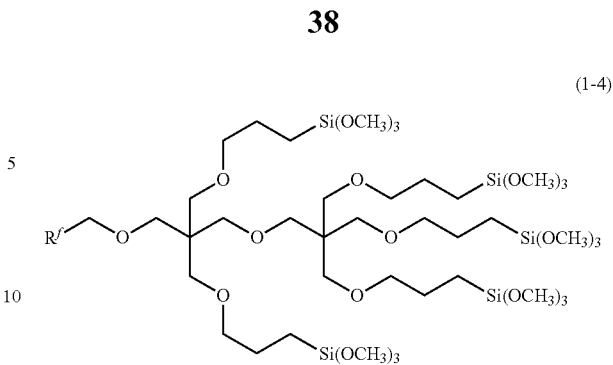
(1-4)

$R^f=CF_3CF_2CF_2-\{OCF(CF_3)CF_2\}_xOCF(CF_3)-$

Ex. 5

Compound (1-5) was obtained in accordance with the method described in Ex. 3 of Patent Document 1. The average value of x is 13. The molecular weight of $R^f$ is 4,700.

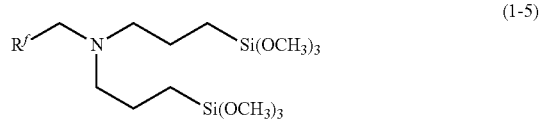
(1-5)

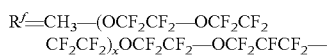
$R^f=CH_3-(OCF_2CF_2-OCF_2CF_2CF_2CF_2)_xOCF_2CF_2-OCF_2CFCF_2-$

Ex. 6

Compound (4-6) was obtained by referring to the method described in Ex. 7 in Examples in WO2013/121984. The average value of x is 13.

$CF_3-(OCF_2CF_2-OCF_2CF_2CF_2CF_2)_xOCF_2CF_2-OCF_2CF_2CF_2-CH_2-OH$ (4-6)

Compound (1-6) was obtained in the same manner as in Ex. 1 of Patent Document 2, except that $R^f-CH_2-OH$ in Ex. 1 of Patent Document 2 was changed to compound (4-6). The average value of x is 13. The molecular weight of $R^f$ is 4,700.

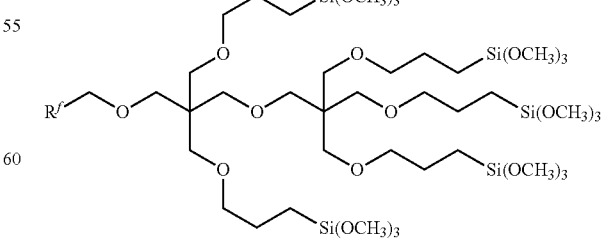
(1-6)

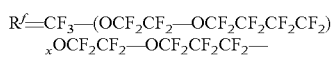
$R^f=CF_3-(OCF_2CF_2-OCF_2CF_2CF_2CF_2)_xOCF_2CF_2-OCF_2CF_2CF_2-$

Ex. 7

Compound (4-7) was obtained by referring to the method described in Ex. 7 in Examples in WO2013/121984. The average value of x is 3.

$$CF_3-(OCF_2CF_2-OCF_2CF_2CF_2CF_2)_xOCF_2CF_2- OCF_2CF_2CF_2-CH_2-OH \quad (4\text{-}7)$$

Compound (1-7) was obtained in the same manner as in Ex. 1 of Patent Document 2, except that $R^f$—$CH_2$—OH in Ex. 1 of Patent Document 2 was changed to compound (4-7). The average value of x is 3. The molecular weight of $R^f$ is 1,400.

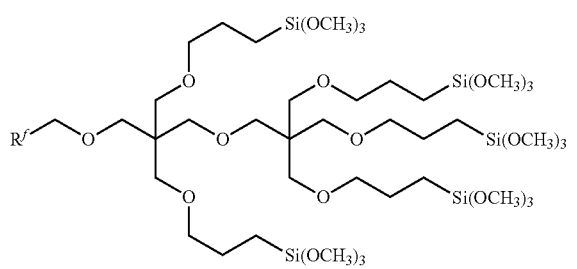

(1-7)

$R^f=CF_3-(OCF_2CF_2-OCF_2CF_2 CF_2CF_2)_xOCF_2CF_2-OCF_2CF_2CF_2-$

Ex. 8

Compound (4-8) was obtained by referring to the method described in Ex. 6-1 in Examples in WO2013/121984. The average value of x is 13.

$$CH_3-(OCF_2CFH-OCF_2CF_2CF_2CH_2)_xOCF_2CFH- OCF_2CF_2CF_2-CH_2-OH \quad (4\text{-}8)$$

In a 50 mL eggplant flask, 8.0 g of compound (4-8), 0.34 g of allyl bromide, 0.08 g of tetrabutylammonium bromide and 0.60 g of a 48 mass % potassium hydroxide solution were put, and the mixture was stirred at 80° C. for 5 hours. The mixture was cooled to 23° C., 10 g of AC-6000 was put, and the mixture was washed twice with water. The obtained crude solution was purified by silica gel column chromatography to obtain 7.9 g of compound (2-8). The average value of x is 13.

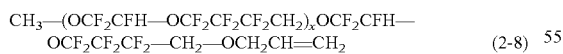

$$CH_3-(OCF_2CFH-OCF_2CF_2CF_2CH_2)_xOCF_2CFH- OCF_2CF_2CF_2-CH_2-OCH_2CH=CH_2 \quad (2\text{-}8)$$

In a 10 mL glass sample bottle, 6.0 g of compound (2-8), 0.06 g of a xylene solution of platinum/1,3-divinyl-1,1,3,3-tetramethyldisiloxane complex (platinum content: 2 mass %), 1.01 g of $HSi(OCH_3)_3$, 0.02 g of aniline, 1.0 g of 1,3-bis(trifluoromethyl)benzene (manufactured by Tokyo Chemical Industry Co., Ltd.), were put, and the mixture was stirred at 40° C. for 8 hours. After completion of the reaction, the solvent, etc. were removed under reduced pressure, followed by filtration through a membrane filter of 1.0 μm pore size to obtain 6.5 g of compound (1-8). The average value of x is 13. The molecular weight of $R^f$ is 4000.

(1-8)

$R^f=CH_3-(OCF_2CFH-OCF_2CF_2 CF_2CH_2)_xOCF_2CFH-OCF_2CF_2CF_2-$

Ex. 9

Synthesis Example 9-0

Compound (9-0) was obtained in accordance with the method described in Ex. 2 (specifically Ex. 2-3) in Examples in WO2013/121984.

$$CF_3(OCF_2CF_2OCF_2CF_2 CF_2CF_2)_mOCF_2CF_2OCF_2CF_2CF_2-C(=O) OCH_3 \quad (9\text{-}0)$$

Average value of m: 13

Synthesis Example 9-1

In a 100 mL eggplant flask, 50 g of compound (9-0), 50 g of AC2000 and 1.5 g of $H_2NCH_2(C=O)CH(CH_2CH=CH_2)_2$ were put, and the mixture was stirred at 40° C. for 6 hours. The reaction crude solution was then purified by silica gel chromatography to obtain 26 g of the desired compound (9-1).

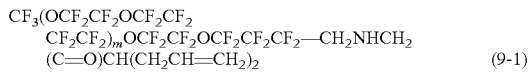

$$CF_3(OCF_2CF_2OCF_2CF_2 CF_2CF_2)_mOCF_2CF_2OCF_2CF_2CF_2-CH_2NHCH_2 (C=O)CH(CH_2CH=CH_2)_2 \quad (9\text{-}1)$$

NMR spectrum of compound (9-1):
$^1$H-NMR: 6.4(1H), 5.6(2H), 4.9(4H), 3.2(2H), 2.0(4H), 1.6(1H)
$^{19}$F-NMR: −55(3F), −82(34F), −87(32F), −115(2F), −126(34F)

Synthesis Example 9-2

Into a 300 mL three-necked flask equipped with a Dimroth condenser, 26 g of compound (9-1) and 46 g of 1,3-bistrifluoromethylbenzene were added under a dry nitrogen atmosphere, and the mixture was stirred under an ice bath. Then, 7 mL of a 2.5 M lithium aluminum hydride-tetrahydrofuran solution was slowly added, and the mixture was stirred at room temperature for 30 minutes. Then, sodium sulfate decahydrate was added until foaming disappeared, and the solid was removed by Celite filtration. The obtained filtrate was concentrated to obtain 25 g of the desired compound (9-2).

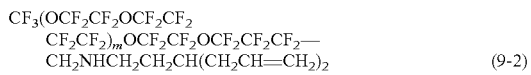

$$CF_3(OCF_2CF_2OCF_2CF_2 CF_2CF_2)_mOCF_2CF_2OCF_2CF_2CF_2- CH_2NHCH_2CH_2CH(CH_2CH=CH_2)_2 \quad (9\text{-}2)$$

NMR spectrum of compound (9-2).
$^1$H-NMR: 6.0(2H), 5.3(4H), 3.5(2H), 2.9(2H), 2.3(4H), 1.8(1H)
$^{19}$F-NMR: −55(3F), −82(34F), −87(32F), −115(2F), −126(34F)

Synthesis Example 9-3

Into a 50 mL three-necked flask under a dry nitrogen atmosphere, 10 g of compound (9-2), 1.1 g of triethylamine and 10 g of 1,3-bistrifluoromethylbenzene were added and while stirring at room temperature, 1.0 g of $Cl(C=O)CH(CH_2CH=CH_2)_2$ was added. The mixture was stirred at room temperature for 24 hours. Then, the reaction crude solution was purified by silica gel chromatography to obtain 2.7 g of the desired compound (9-3).

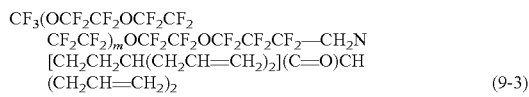

(9-3)

NMR spectrum of compound (9-3):
$^1$H-NMR: 5.8 (4H), 5.0 (8H), 4.3 (2H), 3.5 (2H), 3.0 (1H), 2.5 (2H), 2.3 (2H), 2.2 (2H)
$^{19}$F-NMR: −55 (3F), −82 (34F), −87 (32F), −115 (2F), −126 (34F)

Synthesis Example 9-4

Into a nitrogen-substituted 10 mL eggplant flask, 1.0 g of compound (9-3), 0.004 g of a xylene solution of platinum/1,3-divinyl-1,1,3,3-tetramethyldisiloxane complex (platinum content: 3 mass %), 0.009 g of aniline and 1.0 g of AC-6000 were added, and then, 0.14 g of trimethoxysilane was added, followed by stirring at 40° C. for 4 hours. Then, the solvent was removed to obtain 1.1 g of compound (1-9).

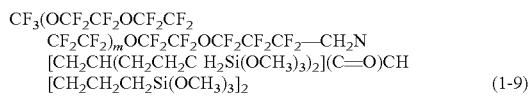

(1-9)

NMR spectrum of compound (1-9):
$^1$H-NMR: 4.5 (2H), 3.8 (36H), 3.0 (1H), 2.0 (3H), 1.7 (8H), 1.5 (8H), 0.7 (8H)
$^{19}$F-NMR: −55 (3F), −82 (34F), −87 (32F), −115 (2F), −126 (34F) The average of m was 13.

Ex. 11 to 19: Production and Evaluation of Article with Surface Layer

A base material was surface treated by using each compound obtained in Ex. 1 to 9 to obtain an article with a surface layer in Ex. 11 to 19. As the surface treating methods, the following dry coating and wet coating methods were used for each Ex. As the base material, chemically strengthened glass was used. The obtained article was evaluated by using the following methods. The results are shown in Table 1.
(Dry Coating Method)
Dry coating was conducted by using a vacuum deposition apparatus (manufactured by ULVAC, VTR350M) (vacuum deposition method). 0.5 g of each compound obtained in Ex. 1 to 8 was filled into a molybdenum boat in the vacuum deposition apparatus, and the inside of the vacuum deposition apparatus was evacuated to 1×10$^{-3}$ Pa or lower. The boat in which the compound was placed, was heated at a temperature-raising rate of 10° C./min or less, and when the deposition rate by a crystal oscillation film thickness meter exceeded 1 nm/sec, the shutter was opened to start film formation on the surface of the base material. When the film thickness reached about 50 nm, the shutter was closed to terminate the film deposition on the surface of the base material. The base material on which the compound was deposited was heat-treated at 200° C. for 30 minutes, and then washed with dichloropentafluoropropane (manufactured by AGC Inc., AK-225) to obtain an article having a surface layer on the surface of the base material.
(Wet Coating Method)
By mixing each compound obtained in Ex. 1 to 8 with C$_4$F$_9$OC$_2$H$_5$ (Novec (registered trademark) 7200 manufactured by 3M) as a medium, a coating liquid with a solid concentration of 0.05% was prepared. The base material was dipped in the coating liquid and left for 30 minutes, whereupon the base material was pulled up (dip coating method). The coating film was dried at 200° C. for 30 minutes and then washed with AK-225 to obtain an article having a surface layer on the surface of the base material.
(Evaluation Methods)
<Method for Obtaining the Normalized F Intensity>
Glass containing 4.96 mass % of fluorine atoms (IGS G4 Fluoride Opal Glass manufactured by Bureau of Analysed Samples Ltd.) was used as a standard sample. Using an X-ray fluorescence analyzer (manufactured by Rigaku, ZSX100e), under conditions of measurement diameter: 30 mm, measurement line: F-Kα, filter: OUT, slit: standard, spectral crystal: RX35 (manufactured by Rigaku), detector: PC, PHA: 100-300, peak angle: 38.794 deg. (20 sec), and B.G. angle: 43.000 deg. (10 sec), the fluorine atom intensity in the surface layer and the fluorine atom intensity in the standard sample were measured. The normalized F intensity in the surface layer of the base material was calculated by dividing the fluorine atom intensity in the surface layer by the fluorine atom intensity in the standard sample. Here, as the standard sample, one having been cleaned with ASAHIKLIN (registered trademark) AE-3000 manufactured by AGC Inc. and dried thoroughly before measurement, was used.
<Fingerprint Stain Removability>
After an artificial fingerprint liquid (liquid consisting of oleic acid and squalene) was applied to the flat surface of a silicon rubber plug, an excess oil was wiped off with a non-woven cloth (BEMCOT (registered trademark) M-3, manufactured by Asahi Kasei Corporation) to prepare a fingerprint stamp. The fingerprint stamp was placed on the surface layer and pressed with a load of 9.8 N for 10 seconds. The haze at the position where the fingerprint adhered, was measured by a haze meter and adopted as the initial value. The position where the fingerprint adhered, was wiped off by using a reciprocating traverse tester (manufactured by K.N.T.) attached with tissue paper, at a load of 4.9 N. The haze value was measured for every wiping reciprocation, and the number of wiping times where the haze became down to 10% or less of the initial value, was measured. The fewer the number of wiping times, the easier it is to remove the fingerprint stain, and the better the fingerprint stain wiping property. The evaluation standards are as follows.
  ⊚ (Excellent): The number of wiping times is 3 times or less.
  ○ (Good): The number of wiping times is from 4 to 5 times.
  Δ (Acceptable): The number of wiping times is from 6 to 8 times.
  × (Unacceptable): The number of wiping times is 9 times or more.
<Friction Resistance>
With respect to the surface layer, by using a reciprocating traverse tester (manufactured by K.N.T.) in accordance with JIS L0849:2013 (ISO 105-X12:2001), a felt (JIS L 3201: 2002 R33W) was reciprocated 15,000 times at a load of 9.8 N, a friction length of 4 cm, and a speed of 40 rpm, whereupon the friction resistance was evaluated. For the friction resistance, the above evaluation test for fingerprint removability was conducted on the sample after the above friction, and the fingerprint removability was evaluated using the same evaluation standards. The better the fingerprint removability after the friction resistance test, the smaller the decrease in performance due to friction and the better the friction resistance.

<Adhesion>

An acrylic adhesive layer of a polyvinyl chloride film having the acrylic adhesive layer (manufactured by Nitto Denko Corporation, ELEP MASKING N-380, tape width: 50 mm) was adhered to the surface layer, and then, in accordance with JIS K6854-1:1999 (ISO 8510-1:1990), the 90-degree peeling force was measured at the time of peeling the polyvinyl chloride film at a peeling speed of 100 mm/min under the condition of 23° C. by using a 90-degree peeling tester (manufactured by Nisshin Kagaku Co., Ltd.). The evaluation standards are as follows. The greater the peeling force, the better the adhesion.

- ◎ (Excellent): The peeling force is 550 mN/50 mm or more.
- ○ (Good): The peeling force is at least 370 mN/50 mm and less than 550 mN/50 mm.
- Δ (acceptable): The peeling force is at least 250 mN/50 mm and less than 370 mN/50 mm.
- × (Unacceptable): The peeling force is less than 250 mN/50 mm.

TABLE 1

| | | Dry coating | | | | Wet coating | | | |
|---|---|---|---|---|---|---|---|---|---|
| Ex. | Compound | Fingerprint stain removability | Friction resistance | Adhesion | Normalized F intensity | Fingerprint stain removability | Friction resistance | Adhesion | Normalized F intensity |
| 11 | (1-1) | ○ | ○ | ○ | 0.46 | ○ | ○ | ○ | 0.47 |
| 12 | (1-2) | ◎ | ◎ | Δ | 0.52 | ◎ | ○ | Δ | 0.49 |
| 13 | (1-3) | ○ | ○ | ○ | 0.42 | ○ | ○ | ◎ | 0.39 |
| 14 | (1-4) | ○ | ○ | ○ | 0.51 | ○ | ○ | ○ | 0.49 |
| 15 | (1-5) | ◎ | ◎ | X | 0.62 | ◎ | ◎ | X | 0.66 |
| 16 | (1-6) | ○ | ○ | X | 0.58 | ○ | ○ | X | 0.61 |
| 17 | (1-7) | X | X | ◎ | 0.23 | X | X | ◎ | 0.22 |
| 18 | (1-8) | Δ | X | ◎ | 0.36 | Δ | X | ◎ | 0.34 |
| 19 | (1-9) | ◎ | ○ | ○ | 0.50 | ◎ | ○ | ○ | 0.44 |

Ex. 11 to 14 and 19, in which the normalized F intensity in the surface layer was from 0.38 to 0.53, were confirmed to be excellent in fingerprint stain removability, friction resistance and adhesion to the protective film.

INDUSTRIAL APPLICABILITY

The article with a surface layer of the present invention can be used as various articles that are required to have water and oil repellency. As the surface layer, for example, a surface protective coating for a display input device such as a touch panel; a surface protective coating for a transparent glass or transparent plastic component; an antifouling coating for kitchen; a water- and moisture-repellent coating or antifouling coating for an electronic device, a heat exchanger, a battery, etc.; an antifouling coating for toiletries; a coating for a component that requires liquid repellency while conducting; a water repellent/waterproof/sliding coating for a heat exchanger; a surface low-friction coating for a vibrating sieve or cylinder interior; etc., may be mentioned. More specific examples of use include front protection plates of displays, anti-reflection plates, polarizing plates, anti-glare plates, or ones having anti-reflection film treatment applied to their surfaces; touch panel sheets or touch panel displays of devices such as cell phones, mobile information terminals, etc.; surface protective coatings for various devices with display input devices that can be operated on the screen by a person's finger or palm, such as touch panel sheets or touch panel displays for mobile phones, mobile information terminals, etc.; decorative building materials around water in toilets, bathrooms, washrooms, kitchens, etc.; waterproof coatings for circuit boards; waterproof or water repellent coatings for heat exchangers; waterproof or water repellent coatings for solar cells; waterproof or water repellent coatings for printed circuit boards; waterproof or water repellent coatings for electronic equipment housings or electronic components; insulation improvement coatings for power transmission lines; waterproof or water repellent coatings for various filters; waterproof coatings for radio wave absorbers or sound absorbers; stain-proof coatings for baths, kitchen equipment or toiletries; waterproof/water repellency/sliding coatings for heat exchangers; surface low friction coatings for vibrating sieves or cylinder interiors; surface protective coatings for machine parts, vacuum equipment parts, bearing parts, automobile parts, tools, etc.

This application is a continuation of PCT Application No. PCT/JP2020/027727, filed on Jul. 16, 2020, which is based upon and claims the benefit of priority from Japanese Patent Application No. 2019-133052 filed on Jul. 18, 2019. The contents of those applications are incorporated herein by reference in their entireties.

What is claimed is:

1. An article with a surface layer, comprising:
a base material; and
a surface layer formed on a surface of the base material, wherein the surface layer comprises groups having —O— between carbon-carbon atoms of a fluoroalkyl group with two or more carbon atoms and has a normalized F intensity in a range of 0.38 to 0.53, the surface layer is formed from a fluorinated ether compound having a group having —O— between carbon-carbon atoms of a fluoroalkyl group with two or more carbon atoms, and having a reactive silyl group, or from a fluorinated ether composition comprising the fluorinated ether compound, and the normalized F intensity is obtained by a process comprising preparing a glass containing 4.96 mass % of fluorine atoms as a standard sample, measuring a fluorine atom intensity in the surface layer and a fluorine atom intensity in the standard sample by an X-ray fluorescence spectrometer, and dividing the fluorine atom intensity in the surface layer by the fluorine atom intensity in the standard sample to obtain the normalized F intensity.

2. The article with a surface layer according to claim 1, wherein the molecular weight of the groups having —O— between carbon-carbon atoms of the fluoroalkyl group with two or more carbon atoms is in a range of 1,500 to 4,000.

3. The article with a surface layer according to claim 2, wherein the fluorinated ether compound is a compound of formula (1), $[R^f—]_aQ[-T]_b$, where $R^f$ is a group having —O— between carbon-carbon atoms of a fluoroalkyl group having two or more carbon atoms, where at least one fluorine atom is bonded to the terminal carbon atom on the Q side, and when there are two or more $R^f$, the two or more RE may be the same or different, Q is an a+b valent linking group, T is —Si(R)$_{3-c}$(L)$_c$, and when there are two or more T, the two or more T may be the same or different, R is an alkyl group, L is a hydrolyzable group or a hydroxy group, and two or more L in T may be the same or different, a is an integer of at least 1, b is an integer of at least 1, and c is 2 or 3.

4. The article with a surface layer according to claim 1, wherein the fluorinated ether compound is a compound of formula (1), $[R^f—]_aQ[-T]_b$, where $R^f$ is a group having —O— between carbon-carbon atoms of a fluoroalkyl group having two or more carbon atoms, where at least one fluorine atom is bonded to the terminal carbon atom on the Q side, and when there are two or more $R^f$, the two or more $R^f$ may be the same or different, Q is an a+b valent linking group, T is —Si(R)$_{3-c}$(L)$_c$, and when there are two or more T, the two or more T may be the same or different, R is an alkyl group, L is a hydrolyzable group or a hydroxy group, and two or more L in T may be the same or different, a is an integer of at least 1, b is an integer of at least 1, and c is 2 or 3.

5. The article with a surface layer according to claim 4, wherein b is an integer of in a range of 2 to 20.

6. The article with a surface layer according to claim 4, wherein a is an integer in a range of 1 to 6.

7. The article with a surface layer according to claim 4, wherein $R^f$ is a group of formula (g1), $R^{f1}—(OR^{f2})_m—$, where $R^{f1}$ is a $C_{1-6}$ fluoroalkyl group, $R^{f2}$ is a $C_{1-6}$ fluoroalkylene group, wherein at least one fluorine atom is bonded to the terminal carbon atom on the Q side of $R^{f2}$ bonded to Q, and m is an integer of at least 1, and when m is 2 or more, $(OR^{f2})_m$, may comprise two or more types of $OR^{f2}$.

8. The article with a surface layer according to claim 7, wherein $R^{f1}$ is a perfluoroalkyl group.

9. The article with a surface layer according to claim 7, wherein m is an integer in a range of 4 to 40, and a proportion of perfluoroalkylene groups among all the $R^{f2}$ is in a range of 60 to 100 mol %.

10. The article with a surface layer according to claim 4, wherein Q is a group of formula (g2-1) where a=d1+d3, and b=d2+d4, a group of formula (g2-2) where a=e1, and b=e2, a group of formula (g2-3) where a=1, and b=2, a group of formula (g2-4) where a=h1, and b=h2, a group of formula (g2-5) where a=i1, and b=i2, or a group of formula (g2-6) where a=1 and b=1,

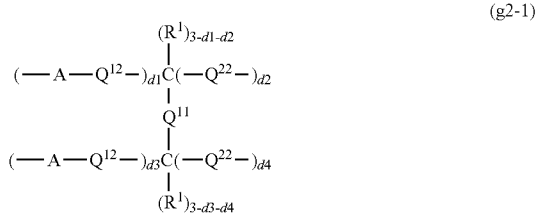

(g2-1)

-continued $(—A—Q^{12}—)_{e1}C(R^2)_{4-e1-e2}(—Q^{22}—)_{e2}$,  (g2-2)

$—A—Q^{13}—N(—Q^{23}—)_2$,  (g2-3)

$(—A—Q^{14}—)_{h1}Z(—Q^{24}—)_{h2}$,  (g2-4)

$(—A—Q^{15}—)_{i1}Si(R^3)_{4-i1-i2}(—Q^{25}—)_{i2}$,  (g2-5)

$—A—Q^{26}—$,  (g2-6)

where the A side is bonded to $R^f$, and the $Q^{22}$, $Q^{23}$, $Q^{24}$, $Q^{25}$ or $Q^{26}$ side is bonded to T, A is a single bond, —C(O)NR$^6$—, —C(O)—, —O—, or —SO$_2$NR$^6$—, $Q^{11}$ is a single bond, —O—, an alkylene group, or a group having —C(O)NR$^6$—, —C(O)—, —NR$^6$—, or —O— between carbon-carbon atoms of an alkylene group with two or more carbon atoms, $Q^{12}$ is a single bond, an alkylene group, or a group having —C(O)NR$^6$—, —C(O)—, —NR$^6$—, or —O— between carbon-carbon atoms of an alkylene group with two or more carbon atoms, and when Q has two or more $Q^{12}$, the two or more $Q^{12}$ may be the same or different, $Q^{13}$ is a single bond where A is —C(O)—, an alkylene group, a group having —C(O)NR$^6$—, —C(O)—, —NR$^6$—, or —O— between carbon-carbon atoms of an alkylene group with two or more carbon atoms, or a group having —C(O)— at the terminal of the N-side of an alkylene group, $Q^{14}$ is $Q^{12}$ when the atom in Z to which $Q^{14}$ is bonded is a carbon atom, or $Q^{13}$ when the atom in Z to which $Q^{14}$ is bonded is a nitrogen atom, and when Q has two or more $Q^{14}$, the two or more $Q^{14}$ may be the same or different, $Q^{15}$ is an alkylene group, or a group having —C(O)NR$^6$—, —C(O)—, —NR$^6$—, or —O— between carbon-carbon atoms of an alkylene group with two or more carbon atoms, and when Q has two or more $Q^{15}$, the two or more $Q^{15}$ may be the same or different, $Q^{22}$ is an alkylene group, a group having —C(O)NR$^6$—, —C(O)—, —NR$^6$—, or —O— between carbon-carbon atoms of an alkylene group with two or more carbon atoms, a group having —C(O)NR$^6$—, —C(O)—, —NR$^6$—, or —O— at the terminal on the side not connected to Si of an alkylene group, or a group having ~C(O)NR$^6$—, —C(O)—, —NR$^6$—, or —O— between carbon-carbon atoms of an alkylene group with two or more carbon atoms and having C(O)NR$^6$—, —C(O)—, —NR$^6$—, or —O— at the terminal on the side not bonded to Si, and when Q has two or more $Q^{22}$, the two or more $Q^{22}$ may be the same or different, $Q^{23}$ is an alkylene group, or a group having —C(O)NR$^6$—, —C(O)—, —NR$^6$—, or —O— between carbon-carbon atoms of an alkylene group with two or more carbon atoms, and the two $Q^{23}$ may be the same or different, $Q^{24}$ is $Q^{22}$ when the atom in Z to which $Q^{24}$ is bonded is a carbon atom, $Q^{23}$ when the atom in Z to which $Q^{24}$ is bonded is a nitrogen atom, and when Q has two or more $Q^{24}$, the two or more $Q^{24}$ may be the same or different, $Q^{25}$ is an alkylene group, or a group having —C(O)NR$^6$—, —C(O)—, —NR$^6$, or —O— between carbon-carbon atoms of an alkylene group with two or more carbon atoms, and when Q has two or more $Q^{25}$, the two or more $Q^{25}$s may be the same or different, $Q^{26}$ is an alkylene group, or a group having —C(O)NR$^6$—, —C(O)—, —NR$^6$ or —O— between carbon-carbon atoms of an alkylene group with two or more carbon atoms, Z is a group having an a+b valent ring structure having a carbon or nitrogen atom to which $Q^{14}$ is directly bonded and a carbon or nitrogen atom to which $Q^{24}$ is directly bonded, $R^1$ is a hydrogen atom or an alkyl group, and when Q has two or more $R^1$, the two or more $R^1$ may be the same or different, $R^2$ is a hydrogen atom, a hydroxy group, an alkyl group, or an acyloxy group, $R^3$ is an alkyl group, $R^6$ is a hydrogen atom, a $C_{1-6}$ alkyl group, or a phenyl group, d1 is an integer of from 0 to 3, d2 is an integer of from 0 to 3, and d1+d2 is an integer of from 1 to 3, d3 is an integer of from 0 to 3, d4 is an integer of from 0 to 3, and d3+d4 is an integer of from 1 to 3, d1+d3 is an integer of from 1 to 5, and d2+d4 is an integer from 1 to 5, e1 is an integer of from 1 to 3, e2 is an integer of from 1 to 3, and e1+e2 is 3 or 4, h1 is an integer of at least 1, and h2 is an integer of at least 1, and i1 is an integer of from 1 to 3, i2 is an integer from 1 to 3, and i1+i2 is 3 or 4.

11. The article with a surface layer according to claim 4, wherein L is a $C_{1-4}$ alkoxy group.

12. The article with a surface layer according to claim 4, wherein b is an integer from 3 to 10.

13. The article with a surface layer according to claim 4, wherein a is an integer in a range of 1 to 4.

14. The article with a surface layer according to claim 4, wherein a is an integer in a range of 1 to 2.

15. The article with a surface layer according to claim 1, which is a member that constitutes a finger-touching surface of a touch panel.

16. The article with a surface layer according to claim 1, wherein the normalized F intensity is in a range of 0.38 to 0.51.

17. The article with a surface layer according to claim 1, wherein the normalized F intensity is in a range of 0.40 to 0.50.

18. The article with a surface layer according to claim 1, wherein the normalized F intensity is in a range of 0.42 to 0.48.

19. The article with a surface layer according to claim 1, wherein the molecular weight of the groups having —O— between carbon-carbon atoms of the fluoroalkyl group with two or more carbon atoms is in a range of 1,500 to 3,500.

20. The article with a surface layer according to claim 1, wherein the molecular weight of the groups having —O— between carbon-carbon atoms of the fluoroalkyl group with two or more carbon atoms is from 2,000 to 3,500.

* * * * *